(12) United States Patent
Kosenko et al.

(10) Patent No.: US 8,757,897 B2
(45) Date of Patent: Jun. 24, 2014

(54) OPTICAL INTERPOSER

(75) Inventors: Valentin Kosenko, Mountain View, CA (US); Edward Lee McBain, Scottsdale, AZ (US); Cyprian Emeka Uzoh, San Jose, CA (US); Pezhman Monadgemi, Fremont, CA (US); Sergey Savastiouk, Saratoga, CA (US)

(73) Assignee: Invensas Corporation, San Jose, CA (US)

( * ) Notice: Subject to any disclaimer, the term of this patent is extended or adjusted under 35 U.S.C. 154(b) by 211 days.

(21) Appl. No.: 13/362,898

(22) Filed: Jan. 31, 2012

(65) Prior Publication Data

US 2013/0177281 A1    Jul. 11, 2013

Related U.S. Application Data

(60) Provisional application No. 61/585,217, filed on Jan. 10, 2012.

(51) Int. Cl.
*G02B 6/36* (2006.01)
(52) U.S. Cl.
USPC ............... 385/89; 385/65; 216/13; 216/24
(58) Field of Classification Search
USPC ............... 385/88–92, 65, 83; 216/13, 24
See application file for complete search history.

(56) References Cited

U.S. PATENT DOCUMENTS

| | | | |
|---|---|---|---|
| 3,761,782 A | 9/1973 | Youmans | |
| 4,905,523 A | 3/1990 | Okada | |
| 5,229,647 A | 7/1993 | Gnadinger | |
| 5,357,103 A | 10/1994 | Sasaki | |
| 5,987,202 A * | 11/1999 | Gruenwald et al. | 385/49 |
| 5,998,234 A | 12/1999 | Murata et al. | |
| 6,115,521 A * | 9/2000 | Tran et al. | 385/52 |
| 6,246,026 B1 | 6/2001 | Vergeest | |
| 6,332,719 B1 | 12/2001 | Nishikawa et al. | |

(Continued)

FOREIGN PATENT DOCUMENTS

| | | |
|---|---|---|
| EP | 0827211 A2 | 3/1998 |
| EP | 0987769 A2 | 3/2000 |
| WO | 2010/105369 A1 | 9/2010 |

OTHER PUBLICATIONS

D.J. Hayes et al., "Printing System for MEMS Packaging", Proceedings, SPIE Conference on Micromachining and Microfabrication, Oct. 2001.

(Continued)

*Primary Examiner* — Ellen Kim
(74) *Attorney, Agent, or Firm* — Haynes and Boone, LLP

(57) ABSTRACT

An optical interposer includes grooves (310) for optical fiber cables (104) coupled to a transducer (120). The grooves are formed by etching a cavity (410) in a substrate (130), filling the cavity with some layer (520), then etching the layer to form the grooves. The cavity has outwardly sloped sidewalls on which mirrors (144) are later formed. The groove etch is selective not to damage the sidewalls. The groove depth is uniform due to high etch selectivity of the layer, and also because of good control over the cavity etch due to the low aspect ratio of the cavity. Electrical circuitry for connection to the transducer is fabricated after the cavity filling but before the groove etch. The cavity filling leaves the wafer planar, facilitating fabrication of the electrical circuitry. Grooves can be provided on top and bottom of the interposer. Other features are also provided.

52 Claims, 16 Drawing Sheets

(56) References Cited

U.S. PATENT DOCUMENTS

| | | | |
|---|---|---|---|
| 6,439,703 | B1 | 8/2002 | Anagnostopoulos et al. |
| 6,625,357 | B2 | 9/2003 | Bowen et al. |
| 6,787,916 | B2 | 9/2004 | Halahan |
| 6,897,148 | B2 | 5/2005 | Halahan et al. |
| 6,933,536 | B2 | 8/2005 | Bowen et al. |
| 6,958,285 | B2 | 10/2005 | Siniaguine |
| 7,001,825 | B2 | 2/2006 | Halahan et al. |
| 7,034,401 | B2 | 4/2006 | Savastiouk et al. |
| 7,060,601 | B2 | 6/2006 | Savastiouk et al. |
| 7,157,016 | B2 * | 1/2007 | Steinberg .................. 216/24 |
| 7,173,327 | B2 | 2/2007 | Siniaguine |
| 7,186,586 | B2 | 3/2007 | Savastiouk et al. |
| 7,241,675 | B2 | 7/2007 | Savastiouk et al. |
| 7,521,360 | B2 | 4/2009 | Halahan et al. |
| 7,964,508 | B2 | 6/2011 | Savastiouk et al. |
| 8,031,993 | B2 | 10/2011 | Bowen |
| 2002/0015920 | A1 | 2/2002 | Steinberg |
| 2003/0034438 | A1 | 2/2003 | Sherrer |
| 2003/0118288 | A1 * | 6/2003 | Korenaga et al. ............ 385/49 |
| 2003/0123819 | A1 | 7/2003 | Nakanishi |
| 2003/0210853 | A1 * | 11/2003 | Kato ........................... 385/18 |
| 2004/0067025 | A1 * | 4/2004 | Haraguchi et al. ........... 385/49 |
| 2005/0196095 | A1 * | 9/2005 | Karashima et al. .......... 385/14 |
| 2006/0022289 | A1 * | 2/2006 | Badhei et al. ............... 257/432 |
| 2007/0036496 | A1 * | 2/2007 | Gaebe ........................ 385/94 |
| 2007/0189659 | A1 * | 8/2007 | Shau .......................... 385/14 |
| 2008/0290524 | A1 | 11/2008 | Lanzerotti et al. |
| 2010/0221488 | A1 | 9/2010 | Mick et al. |
| 2010/0247042 | A1 * | 9/2010 | Suzuki et al. ................ 385/88 |
| 2011/0075965 | A1 | 3/2011 | Demeritt |
| 2011/0311189 | A1 | 12/2011 | Bryon et al. |
| 2012/0060605 | A1 | 3/2012 | Wu et al. |

OTHER PUBLICATIONS

Sekimura, M., *Anisotropic Etching of Surfactant-Added TMAH Solution*, Micro Electro Mechanical Systems, 1999, MEMS'99, Twelfth IEEE International Conference in Orlando, FL USA Jan. 17-21, 1999, Piscataway, NJ USA, IEEE, US Jan. 17, 1999, pp. 650-655, XP010321781, ISBN: 978-07803-5194-3 p. 655; figure 13.

Invitation to Pay Additional Fees and, Where Applicable, Protest Fee in corresponding International Application No. PCT/US2013/020562 dated Apr. 23, 2013.

International Search Report and Written Opinion in corresponding International Application No. PCT/2013/020578 dated Apr. 24, 2013.

PCT Notification of Transmittal of the International Search Report and the Written Opinion of the International Searching Authority or the Declaration, International Search Report, and Written Opinion of the International Searching Authority in PCT/US2013/020562, dated Jul. 19, 2013, 17 pages.

H. Hsiao et al., "Compact and passive-alignment 4-channel × 2.5-Gbps optical interconnect modules based on silicon optical benches with 45° micro-reflectors", Optics Express, vol. 17, No. 26, Dec. 21, 2009.

T. Bowen et al., "Silicon Interposer for Compact Right Angle Coupling of Flip Chip VCSEL and Detector Arrays to Multi-Facet Endface Optical Fibers", Pan Pacific Symposium Conference Proceedings, Jan. 18, 2011.

J.B. Breedis, "Monte Carlo Tolerance Analysis of a Passively Aligned Silicon Waferboard Package", 2001 Electronic Components and Technology Conference Proceedings, 2001.

Thru-Silicon Vias, Current State of the Technology, Jan. 30, 2011, 4 pages.

Amini, B. Vakili et al. "Sub-Micro-Gravity Capacitive SOI Microaccelerometers," The 13$^{th}$ International Conference on Solid-State Sensors, Actuators and Microsystems, Seoul, Korea, Jun. 5-9, 2005, pp. 515-518.

Bellew, Colby L. et al. "An SOI Process for Fabrication of Solar Cells, Transistors and Electrostatic Actuators," The 12$^{th}$ International Conference on Solid State Sensors, Actuators and Microsystems, Boston, Jun. 8-12, 2003, pp. 1075-1079.

Bauer, Tomas "High Density Through Wafer Via Technology," Silex Microsystems, NSTI-Nanotech 2007, www.nsti.org, ISBN 1420061844 vol. 3, 2007, pp. 116-119.

Thevenoud, J-M. et al, "DRIE Technology: From Micro to Nanoapplications," Alcatel Micro Machining Systems, ESIEE, no later than Jun. 12, 2011, pp. 1-8.

Kosenko et al., U.S. Appl. No. 13/042,186, filed Mar. 7, 2011, 34 pages.

Kosenko et al., U.S. Appl. No. 13/181,006, filed Jul. 12, 2011, 38 pages.

Long-Sun Huang, "Silicon Bulk Micromachining in MEMS Packaging and Optical Applications", Dissertation submitted for the degree Doctor of Philosophy in Mechanical Engineering, University of California, Los Angeles, 1999.

M.J. Madou, "MEMS Fabrication", in *The MEMS handbook*, Chapter 16, edited by Mohamed Gad-el-Hak, CRC Press, 2001.

X. Zheng et al., "Optical proximity communication using reflective mirros", Optics Express, vol. 16, No. 19, Sep. 15, 2008.

I. Zubel et al., "Micromirrors inclined at 45° towards Si substrates fabricated by anisotropic etching", Optica Applicata, vol. XLI, No. 2, 2011.

Wikipedia File: Silicon-unit-cell-3D-balls.png, http://en.wikipedia.org/wiki/File:Silicon-unit-cell-3D-balls.png, no later than Mar. 14, 2012.

Properties of silicon and silicon wafers, http://www.el-cat.com/silicon-properties.htm, no later than Mar. 14, 2012.

* cited by examiner

OPTICAL INTERPOSER

CROSS-REFERENCE TO RELATED APPLICATIONS

The present application claims priority of U.S. provisional application No. 61/585,217 filed by V. Kosenko et al. on Jan. 10, 2012, incorporated herein by reference.

BACKGROUND OF THE INVENTION

The present invention relates to optical interposers for providing interface between optical fibers and electrical circuits. (The terms "optical" and "light" as used herein denote electromagnetic radiation of any spectrum, not limited to visible light; the terms "optical fiber" or just "fiber" denote an optical fiber cable.)

Fiber optics is increasingly used to transmit information to and from electrical circuits. Energy conversion between optical fiber and electrical circuitry is performed by opto-electrical transducers. Miniature packages have been created which combine the transducers, the optical fiber, and electrical circuitry to achieve high speed and low power losses. One example is described in Hsu-Liang Hsiao et al., "Compact and passive-alignment 4-channel×2.5-Gbps optical interconnect modules based on silicon optical benches with 45° micro-reflectors", OPTICS EXPRESS, 21 Dec. 2009, Vol. 17, No. 26, pages 24250-24260, illustrated in FIGS. 1-3.

FIG. 1 shows optical fibers 104 (104.1 and 104.2) used to interconnect integrated circuits (chips) 110.1, 110.2 mounted on respective printed circuit boards (PCBs) 114.1, 114.2. Chip 110.1, fiber 104.1, and PCB 114.1 are part of a signal transmitting module 116.1. Chip 1101.2, fiber 104.2, and PCB 114.2 are part of a signal receiving module 116.2. Electrical signals from chip 110.1 are provided to an opto-electronic transducer 120.1 for conversion to light. Transducer 120.1 is an integrated circuit (IC or "chip") containing a semiconductor laser (vertical-cavity surface emitting laser, "VCSEL"). Transducer 120.1 is mounted on a silicon interposer (silicon optical bench, or SiOB) 124.1 made using a silicon substrate 130.1. Conductive lines 134.1 transmit electrical signals from chip 110.1 to transducer 120.1. In response, the transducer produces optical signals in a vertical light beam 140.1. Light beam 140.1 is reflected by a mirror 144.1 formed of a gold layer deposited on the silicon interposer's surface inclined at 45° to the horizontal. The reflected beam from mirror 144.1 enters the optical fiber 104.1.

Fiber 104.1 is connected to a fiber 104.2 of module 116.2 by a connector 150. Module 116.2 is similar to module 116.1. The optical signals are emitted from fiber 104.2 in a horizontal beam 140.2, which is reflected by a 45° mirror 140.2 to travel vertically to a transducer 120.2. The mirror is part of a silicon interposer 124.2 made using silicon substrate 130.2. Transducer 120.2 is mounted on interposer 124.2. Transducer 120.2 is a photodetector integrated circuit which converts the optical signals into electric signals provided, via conductive lines 134.2, to chip 110.2. Interposer 124.2 and chip 110.2 are mounted on PCB 114.2.

FIGS. 2 and 3 illustrate a module 116 which can be 116.1 or 116.2. FIG. 2 is a top view, and FIG. 3 shows a cross section by a plane transversal to fibers 104. Each module 116.1, 116.2 has four fibers 104 (i.e. 104.1 or 104.2); transducer 120.1 has four lasers emitting four respective beams 140.1 entering four respective fibers 104.1; transducer 120.2 has four photodetectors which receive four respective beams 114.2 passing through four respective fibers 114.2. As shown in FIG. 2, in each module, monocrystalline silicon substrate 130 having (100)-orientation supports all the four fibers 104. The fibers are mounted in V-grooves 310 formed by a wet etch of substrate 130. The etch also forms the silicon surface underlying the mirror 144. The V-grooves have 45°-sloped sidewalls. The 45° angle is produced due to the crystal structure of the silicon substrate 130, which is a monocrystalline silicon wafer of (100)-orientation. The angle so produced is highly precise, and this helps in precise positioning of fibers 104 because the fibers do not reach the groove bottom and the fiber position is therefore determined by the angle of the grooves' sidewalls) (45° and the groove's width at the top, not by the groove's depth.

SUMMARY

This section summarizes some features of the invention. Other features may be described in the subsequent sections. The invention is defined by the appended claims, which are incorporated into this section by reference.

Some embodiments of the present invention provide optical interposers and methods of their fabrication that allow precise fiber positioning in grooves of different shapes. For example, rectangular grooves can be used (with vertical sidewalls). Vertical sidewalls may be desirable to reduce the pitch between the adjacent fibers (measured as the distance between the centers of the adjacent fibers or adjacent grooves). For example, in FIG. 3, the width of each groove at the top is greater than each fiber's diameter. If the sidewalls are vertical, then the width of each groove can be equal to the fiber's diameter. A denser, more compact structure can therefore be provided for a given fiber diameter (i.e. the diameter-to-pitch ratio can be increased). Further, if the sidewalls are vertical, then the groove width, and the spacing between the grooves, are independent of the grooves' depth (with V-grooves, the grooves' width at the top increases with depth, and the spacing between the grooves correspondingly decreases). If the groove width and the spacing between the grooves are independent of the grooves' depth, then the fibers' vertical position (defined by the depth) is independent of the spacing between the grooves. This is advantageous because the areas between the grooves can be used for various purposes (e.g. for circuitry or for mechanical support of cantilevered transducers), and the spacing between the grooves can be optimized independently from the fibers' vertical positions.

However, the invention includes V-groove embodiments, and is not limited to vertical sidewalls or other features described herein except as defined by the claims. Also, in the V-groove embodiments, the sidewall angle may be different than 45°. The angle may be any value. In some embodiments, the angle is above 85° (measured from the horizontal) but not greater than 90°. In other embodiment, the angle is above 90°, i.e. the grooves' sidewalls overhang the grooves. Rounded sidewalls and other groove shapes are also possible. See e.g. U.S. Pat. No. 6,332,719 issued Dec. 25, 2001 to Nishikawa et al. and U.S. Pat. No. 8,031,993 issued Oct. 4, 2011 to Bowen, both incorporated herein by reference.

The interposers can be based on substrates made of silicon or some other semiconductor material, and/or glass, metal, and/or other materials.

FIGS. 4-6 illustrate one embodiment of the present invention in the same cross sectional view (transversally to the fibers) as in FIG. 3. In this embodiment, grooves 310 are formed by two etches as follows:

First, a cavity 410 is etched in substrate 130. This cavity will eventually house all the fibers 104. If desired, the cavity sidewalls can be inclined at 45° or some other angle "α" to provide mirrors (not shown in FIG. 4) or other elements.

The cavity is then filled with some material 520 (FIG. 5). Layer 520 is then patterned and etched to form grooves 310 (FIG. 6). The etch is selective to substrate 130. Due to the etch selectivity, the 45° sidewall supporting the mirrors will not be damaged by the etch even though the sidewall is exposed early during the etch.

In some embodiments, the process is tolerant to misalignment between the cavity mask (the etch mask, not shown, used to form the cavity in FIG. 4) and the groove mask (not shown) because the cavity mask can be shifted right or left in the view of FIG. 6 relative to the groove mask.

In some embodiments, high depth uniformity is achieved in groove formation for the following reasons. Cavity 410 (FIG. 4) has a low aspect ratio (height-to-depth ratio), so the etch of cavity 410 can be easily controlled to provide a precise uniform depth throughout the cavity. In some embodiments, the aspect ratio is at most 1:2. The etch of layer 520 can also be easily controlled because this etch is selective to substrate 130 serving as an etch stop. For example, substrate 130 can be silicon, and layer 520 silicon dioxide. Depending on the materials involved, the etch selectivity can be improved by forming an additional etch-stop layer on cavity 410 before deposition of layer 520. In some embodiments, the etch selectivity is at least 2:1.

Further, in some embodiments, the process of FIGS. 4-6 is easy to integrate with other steps that form conductive lines or other circuitry in or over substrate 130. Such circuitry can be formed between the stages of FIGS. 5 and 6, i.e. after the deposition of layer 520 before the groove etch. The wafer is flat at this stage, and many conventional processes for circuit fabrication work better on flat wafers. (We will sometimes refer to substrate 130 together with other elements integral with the substrate as a "wafer"; in some embodiments multiple interposers are simultaneously fabricated in the same wafer.) In particular, wafer handling and photolithography work better with flat wafers. The material 520 can be chosen consistently with the processes forming other circuitry. For example, if high temperatures are required by these processes, the material 520 can be chosen to withstand high temperatures. If mirrors 144 (not shown in FIGS. 4-6) or other elements need to be formed of non-refractory metal (such as gold), the metal deposition can be postponed until after the high temperature steps.

FIG. 7 is a view of an interposer 124 with a mirror 144 and a fiber or fibers 104 in a cross section taken along a fiber 104. The fibers are inserted into grooves 310 from the interposer's left side. The cavity 410 does not have a sidewall on that side. The cavity is initially formed with the sidewalls on all sides (FIG. 4), but one side is then removed during dicing of wafer 130. More particularly, one sidewall of cavity 410 is positioned on the wafer's scribe line. This sidewall is removed by the dicing process.

The invention is not limited to the features and advantages described above except as defined by the appended claims.

DESCRIPTION OF SOME EMBODIMENTS

The embodiments described in this section illustrate but do not limit the invention. The invention is not limited to particular materials, dimensions, process steps, or other features except as defined by the appended claims.

Figure 8:
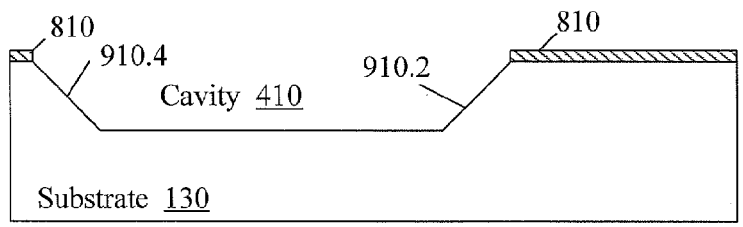
FIG. 8 shows a vertical cross section of an optical interposer during fabrication according to some embodiments of the present invention.
Figure 9:
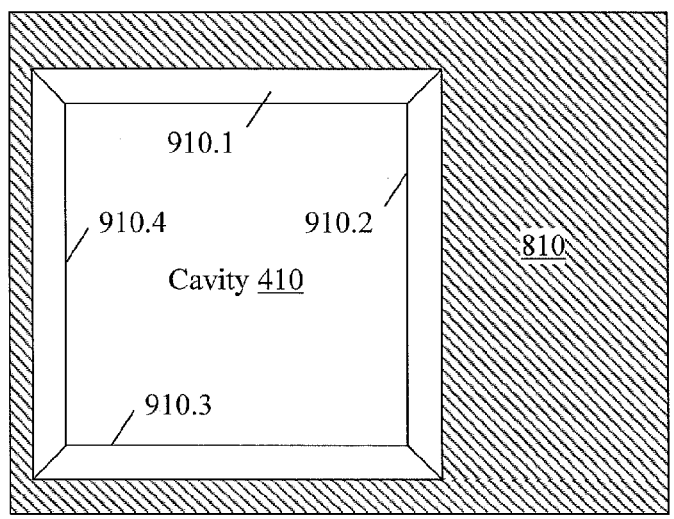
FIG. 9 is a top view of an optical interposer during fabrication according to some embodiments of the present invention.

FIG. 8 (cross sectional view) and FIG. 9 (top view) illustrate substrate 130 with cavity 410 at the beginning stages of fabrication of an optical interposer according to some embodiments of the present invention. Substrate 130 can be silicon, silicon on insulator (SOI), glass, metal, or other materials. In some embodiments, substrate 130 is part of a wafer in which multiple interposers are simultaneously fabricated. In an exemplary embodiment discussed immediately below, substrate 130 is monocrystalline silicon having a thickness of 750 µm.

Substrate 130 is initially planar on top and bottom. Cavity 410 is formed by a masked timed etch. More particularly, substrate 130 is cleaned, and a masking layer 810 is deposited on the entire top surface to provide a hard mask. In some embodiments, layer 810 is silicon dioxide thermally grown to an exemplary thickness of 1.0 µm, but silicon nitride and other layers and fabrication processes can also be used. (Layer 810 is optional, and can be omitted; the hard mask may or may not be desirable depending on the type of etch used to form the cavity, the cavity depth, the material of substrate 130, and possibly other factors.)

Masking layer 810 is patterned with photoresist (not shown) to define cavity 410. The photoresist is removed, and substrate 130 is etched through the mask opening to form the cavity. The cavity has a horizontal bottom surface (parallel to the substrate's bottom surface) and sloped sidewalls 910.1 through 910.4 that are inclined at an exemplary angle of 45° to the bottom surface of the substrate. The mirrors will be formed on one of these sidewalls, e.g. on sidewall 910.2. (The invention is not limited to a cavity having four sidewalls; the cavity can be non-rectangular in top view, and may have rounded and other shapes.)

An exemplary etch of cavity 410 is wet etch which provides the 45° sidewalls if wafer 130 is a common (100)-silicon wafer. A suitable wet etch is KOH with Isopropyl Alcohol as an additive. The etch is timed to provide the desired cavity depth. In some embodiments, the cavity depth is 100 µm, and the etching time is about 100 minutes. Other etching processes can also be used. See e.g. Hsiao et al. cited above. The cavity depth can be any suitable value, e.g. 100 to 500 µm or smaller or larger. In some embodiments, the cavity is rectangular, and the dimensions of the cavity's top surface are 2.1 mm along the sidewall 910.1 and 2.0 mm along the sidewall 910.2, but other shapes and dimensions are possible. The aspect ratio of the cavity is thus about 1:21. The low aspect ratio is desirable to provide a uniform, highly controllable cavity depth. Other aspect ratios can also be used.

Figure 5:
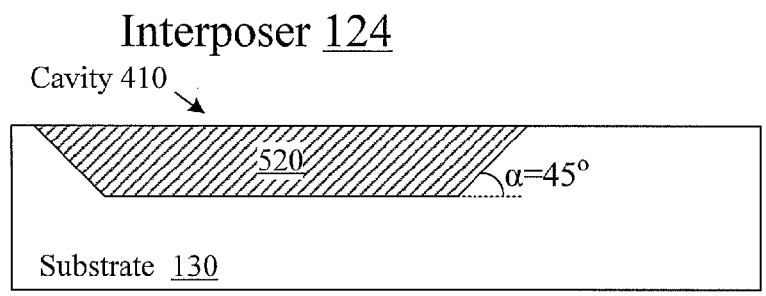
Figure 6:
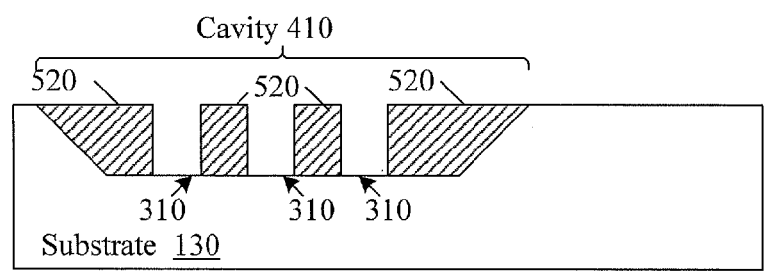
Figure 7:
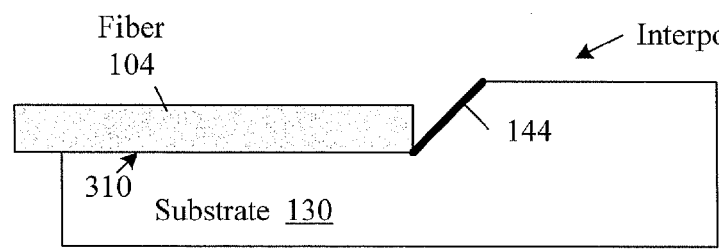
FIG. 7 shows a vertical cross section of an optical interposer with fibers according to some embodiments of the present invention.
Figure 10:
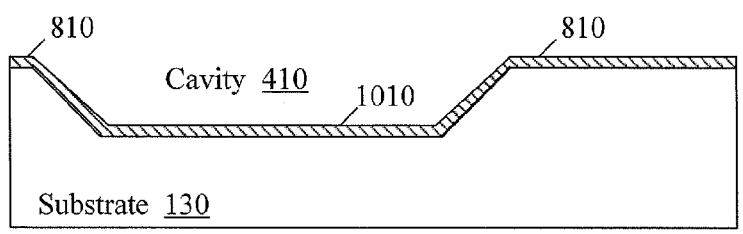
FIGS. 10, 11, 12, 13, 14, 15, 16 show vertical cross sections of optical interposers during fabrication according to some embodiments of the present invention.

Then an optional etch stop layer 1010 (FIG. 10) is deposited over the substrate to provide an etch stop in subsequent etch of layer 520 (FIGS. 5, 6). In some embodiments, layer 520 will be polysilicon, and layer 1010 is silicon dioxide thermally grown on silicon substrate 130 to a thickness of 2.0 µm or deposited by CVD (e.g. from TEOS). The thickness of layer 810 increases in this step.

The material of layer 520 is chosen for compatibility with other fabrication processes that will form circuitry in substrate 130. Polysilicon is desirable for its tolerance to high temperatures such as present in thermal oxidation of silicon. Polysilicon is also easy and inexpensive to deposit. In some embodiments, layer 520 will be used to provide mechanical support for a cantilevered transducer 120 as described below but will not be used to provide semiconductor circuit elements such as transistor regions. Low quality polysilicon and inexpensive deposition methods can therefore be used. In particular, layer 520 can be metallurgical polysilicon formed by LTCVD (Low Temperature Chemical Vapor Deposition). Another possibility is polysilicon deposited by high temperature (1200° C.) CVD. Other processes can also be used. Layer 520 can be amorphous silicon or polysilicon having very small fine size (nano-grain), or can be epitaxially grown silicon, or other kind. Other suitable materials include polyimide and photoresist (especially if high temperatures will not be used). Other materials are also possible.

In embodiments other than discussed immediately below, one or more (possibly all) process steps that form the circuitry in substrate 130 are performed before or during the deposition of layer 520, and the material for layer 520 is chosen based on other considerations.

Figure 11:
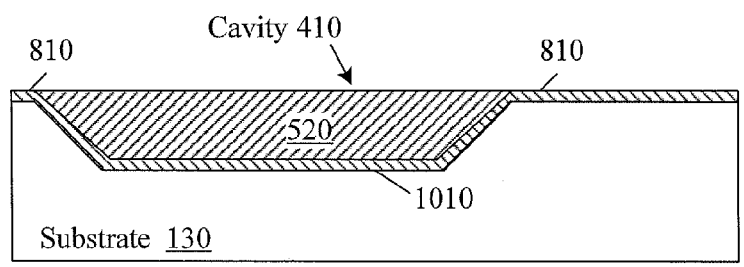

Layer 520 initially covers the whole wafer, but then is polished by chemical mechanical polishing (CMP) stopping on oxide 810. See FIG. 11. Cavity 410 remains filled by layer 520 but layer 520 is removed outside the cavity. In other embodiments, the CMP or other process leaves layer 520 covering the entire wafer, with a planar top surface. (Non-planar top surface is also possible.)

Before etching the layer 520 to form the grooves 310, the wafer is processed to form circuitry for connection to transducer or transducers 120 and possibly for other purposes. The wafer is planar at the stage of FIG. 11, as desirable for many IC fabrication processes. If desired, an additional planar layer (e.g. silicon nitride) can be deposited over the wafer as a protective layer to protect the layer 520.

Figure 1:
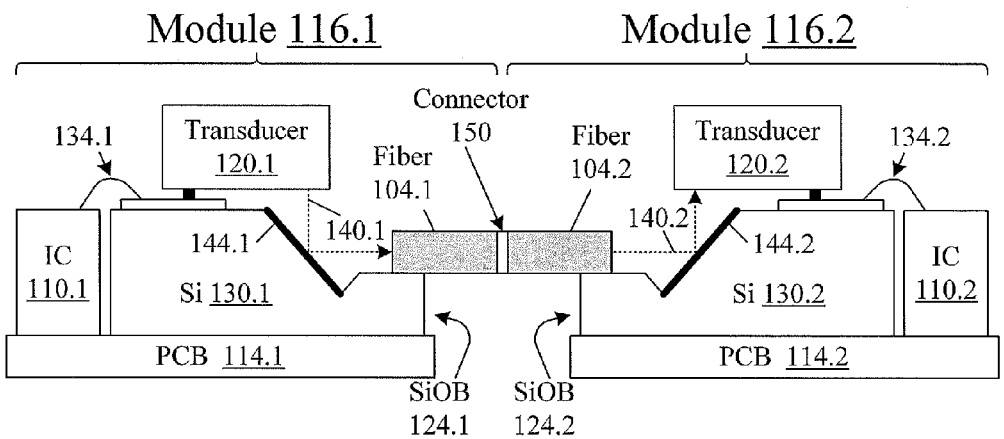
FIG. 1 shows a vertical cross section of an opto-electrical system according to prior art.

The wafer can be processed to create circuitry 134 (FIG. 1) or any other desired circuitry, including for example circuit elements both at the top and the bottom of substrate 130, with through-wafer interconnects between such circuit elements. See for example the following U.S. patents incorporated herein by reference:

U.S. Pat. No. 7,964,508 ("Dielectric trenches, nickel/tantalum oxide structures, and chemical mechanical polishing techniques") issued Jun. 21, 2011 to Savastiouk et al.;

U.S. Pat. No. 7,521,360 ("Electroplating and electroless plating of conductive materials into openings, and structures obtained thereby") issued Apr. 21, 2009 to Halahan et al.;

U.S. Pat. No. 7,241,675 ("Attachment of integrated circuit structures and other substrates to substrates with vias");

U.S. Pat. No. 7,186,586 ("Integrated circuits and packaging substrates with cavities, and attachment methods including insertion of protruding contact pads into cavities");

U.S. Pat. No. 7,060,601 ("Packaging substrates for integrated circuits and soldering methods");

U.S. Pat. No. 7,034,401 ("Packaging substrates for integrated circuits and soldering methods");

U.S. Pat. No. 7,001,825 ("Semiconductor structures having multiple conductive layers in an opening, and methods for fabricating same");

U.S. Pat. No. 6,897,148 ("Electroplating and electroless plating of conductive materials into openings, and structures obtained thereby");

U.S. Pat. No. 6,787,916 ("Structures having a substrate with a cavity and having an integrated circuit bonded to a contact pad located in the cavity").

See also U.S. patent application Ser. No. 13/042,186 filed Mar. 7, 2011; and Ser. No. 13/181,006 filed Jul. 12, 2011, both filed by V. Kosenko et al. and both incorporated herein by reference.

Figure 12:
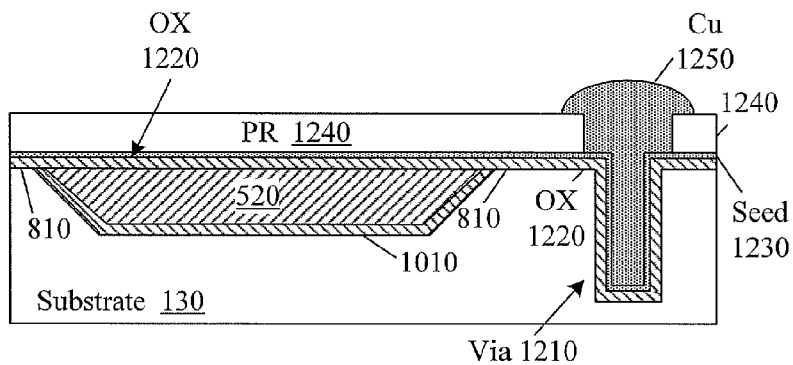

An exemplary process forming such circuitry is as follows. A via 1210 (FIG. 12) is formed in the top surface of substrate 130 at each location of a desired through-substrate via (through-silicon via if the substrate is made of silicon). The via initially does not go through the substrate, but is deeper than the substrate's final thickness (the substrate will be thinned as described below). A silicon dioxide layer 1220 is grown over the substrate by thermal oxidation, at an exemplary temperature of 1100° C. for 160 minutes to an exemplary thickness of 1.0 µm. Layer 1220 also forms on polysilicon 520 unless polysilicon 520 is covered by a protective layer described above in connection with FIGS. 10-11 but not shown in the figures. The thermal oxidation increases the thickness of oxide 810 if this oxide is not covered by the protective layer.

Then a seed layer 1230 (e.g. copper) is sputtered on the wafer for subsequent electroplating. A photoresist film 1240 (e.g. dry-film-resist) is deposited on the wafer and patterned to expose the vias 1210 and adjacent areas. Copper 1250 is electroplated to fill the vias 1210 and protrude above the resist 1240.

Figure 13:
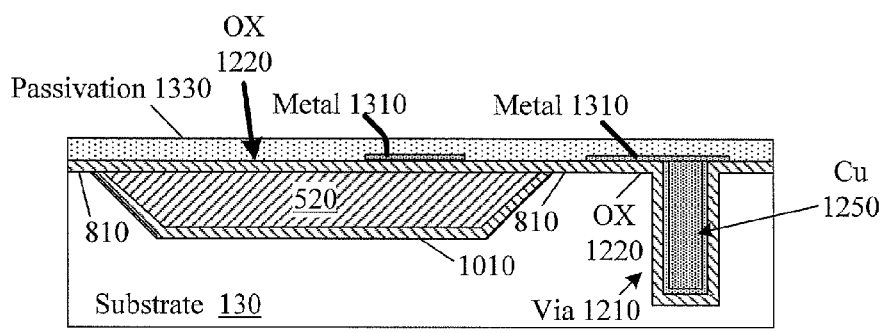

A subsequent stage is illustrated in FIG. 13. More particularly, copper 1250 is polished by CMP to provide a planar top surface. Then resist 1240 is stripped, and copper layers 1250 and 1230 are polished down by CMP to the level of oxide 1220. Oxide 1220 becomes exposed. (Both layers 1250, 1230 remain in vias 1210 but are shown simply at 1250 in some drawings.) Another metal layer 1310 is sputtered on the wafer and patterned photolithographically to form conductive lines that will connect the metalized vias 1210 (i.e. the copper in vias 1210) to transducer contacts and/or other circuit elements (e.g. transistors, resistors, diodes, capacitors, or other elements that can be formed in the interposer). Metal pads 1310 are also formed on oxide 1220 over cavity 1410 to provide mechanical support for cantilevered transducers as described below. These and other metal pads may or may not be part of electrical circuitry and may or may not be connected to other circuit elements. Additional dielectric and metal layers (not shown) can be deposited to create multiple interconnect layers and other circuit elements for circuitry connected to the transducers and for other circuitry. Then a passivation layer 1330 (e.g. polyimide) is formed to cover the top side of the wafer.

Figure 14:
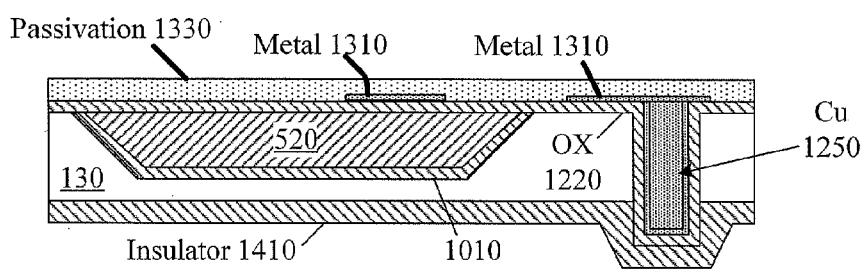
Figure 15:
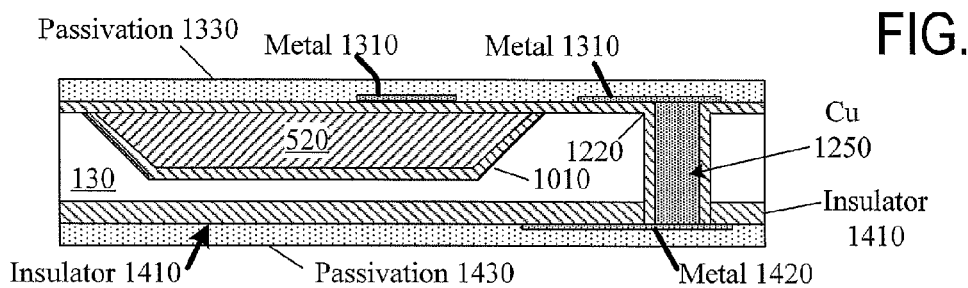

Then (FIG. 14) the wafer is thinned to turn the vias 1210 into through-vias (through holes). Copper 1250 (and 1230) and insulator 1220 protrude down from substrate 130. Then insulator 1410 (e.g. polyimide) is deposited on the bottom surface, and the bottom surface is planarized by CMP which does not remove all of insulator 1410 but exposes the copper. See FIG. 15.

Metal 1420 (e.g. copper) is deposited (e.g. by physical vapor deposition, "PVD") on the bottom surface of the wafer. Metal 1420 is patterned photolithographically to provide interconnect lines for connecting the metalized vias to a controller chip (shown in FIGS. 22, 23) that will control the transducers 120, and possibly to provide other interconnect lines or other circuit elements. Other interconnect layers (not shown) and other circuit elements (e.g. transistors, diodes, resistors, capacitors, etc., not shown) can also be formed at the bottom.

A passivation layer 1430 (e.g. polyimide) is deposited on the bottom surface and is patterned photolithographically to form contact openings exposing the metal 1420. See FIG. 16. The exposed portions of metal 1420 form contact pads that can be soldered or otherwise attached to the controller chip or other circuits.

Figure 16:
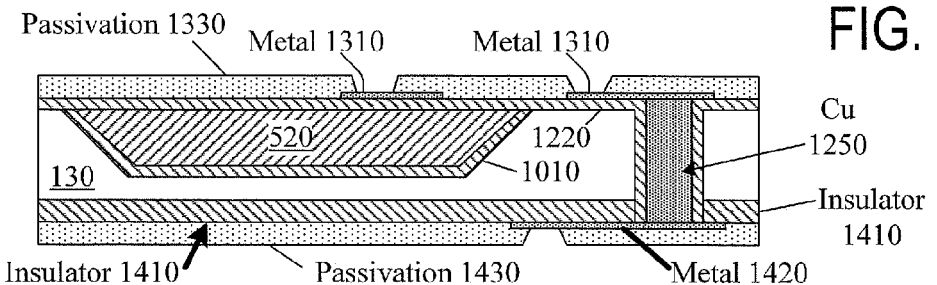
Figure 17A:
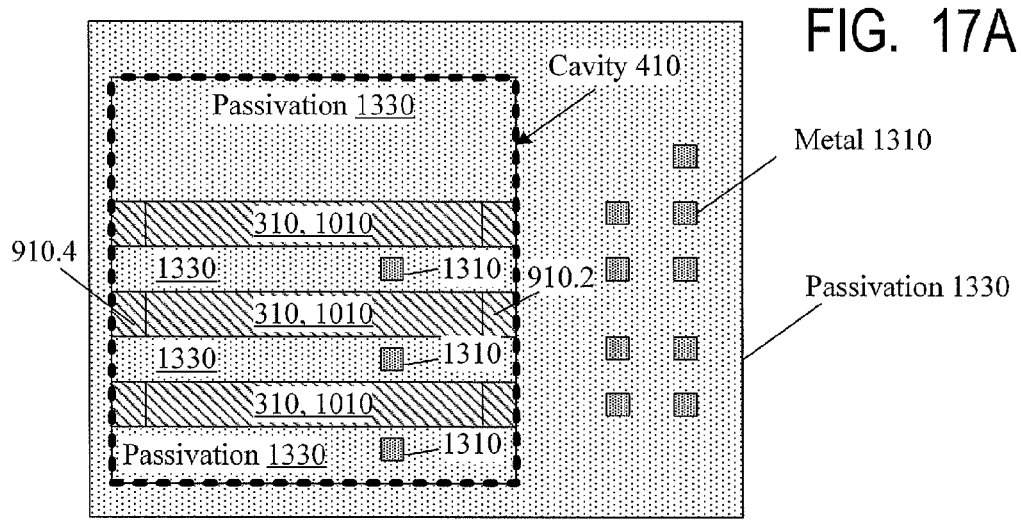
FIG. 17A is a top view of an optical interposer during fabrication according to some embodiments of the present invention.
Figure 17B:
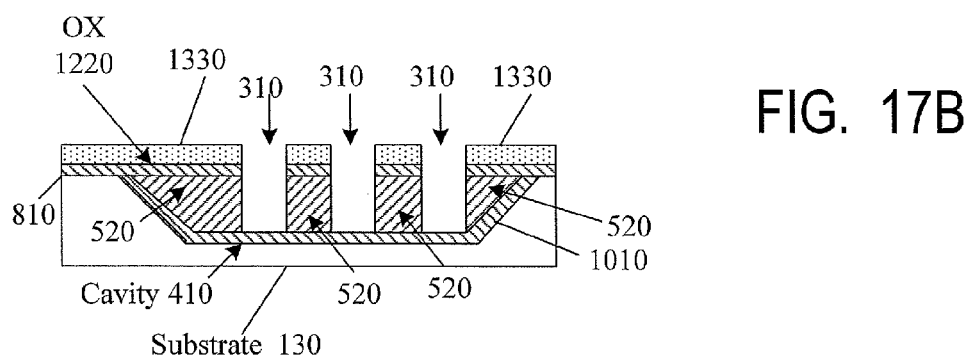
FIG. 17B shows a vertical cross section of an optical interposer during fabrication according to some embodiments of the present invention.

The top surface of the wafer is then processed to form contact openings to metal 1310 and to form grooves 310. FIG. 17A is a top view of the resulting structure, and FIG. 17B shows the wafer's cross section perpendicular to the grooves. For example, in some embodiments, the wafer is covered with photoresist (not shown), and the photoresist is patterned to define grooves 310 and the contact openings to metal 1310 (FIG. 16). Passivation 1330 is etched away through the photoresist openings over the grooves to be formed and in the contact openings. Oxide 1220 becomes exposed over the grooves 310. (Alternatively, the etch of passivation 1330 can remove the oxide 1220 over the grooves and expose the layer 520). After the etch of passivation 1330, the photoresist is removed, and another photoresist layer (not shown) is deposited and patterned to define the grooves 310. If oxide 1220 was not removed over the grooves, it is removed at this time to expose layer 520 in the grooves. Layer 520 is etched selectively to the photoresist and to layer 1010 to form the grooves and expose the layer 1010. In this embodiment, the groove sidewalls are vertical, but non-vertical sidewalls are formed in other embodiments. In this embodiment, layer 520 is polysilicon etched by DRIE (deep reactive ion etch), possibly the Bosch process, and layer 1010 is silicon dioxide. The etch selectivity of polysilicon to silicon dioxide is at least 100:1. Other fabrication processes and selectivity values can also be used.

Exemplary dimensions that can be achieved for rectangular grooves 310 with monocrystalline substrate 130 and polysilicon spacers 520, using silicon oxide 1010 as an etch stop, are as follows: the groove width is 135 µm; the groove pitch (the distance between the centers of adjacent grooves) is 250 µm; the groove depth is 100 µm. In some embodiments with rectangular grooves, a suitable groove width is 50 to 1000 µm, the groove pitch is 150 to 2000 µm, and the groove depth is 100 to 500 µm. Other ranges are also possible.

A reflective layer (e.g. aluminum, gold, or some other metal) with desired reflectivity properties is deposited and patterned to form mirrors 144 (FIG. 18) at the grooves' ends on the cavity sidewall 910.2.

Figure 18:
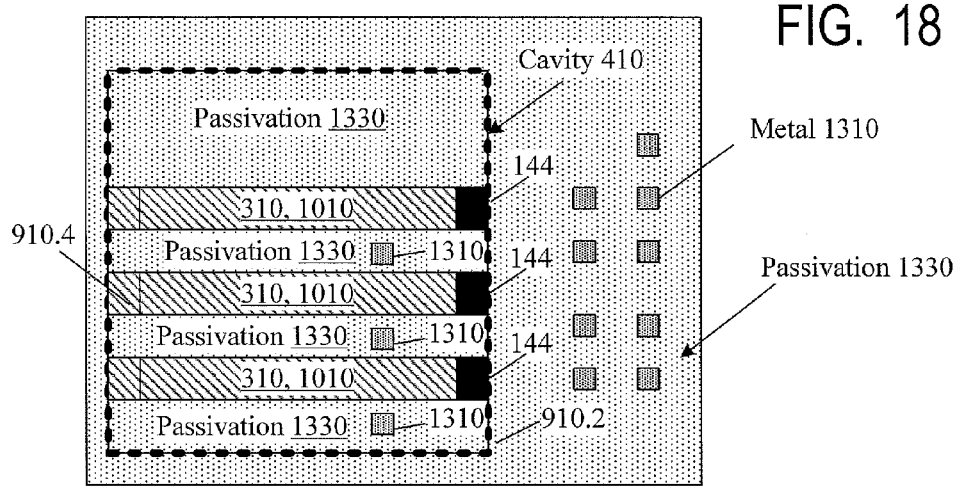
FIGS. 18, 19 are top views of optical interposers during fabrication according to some embodiments of the present invention.
Figure 19:
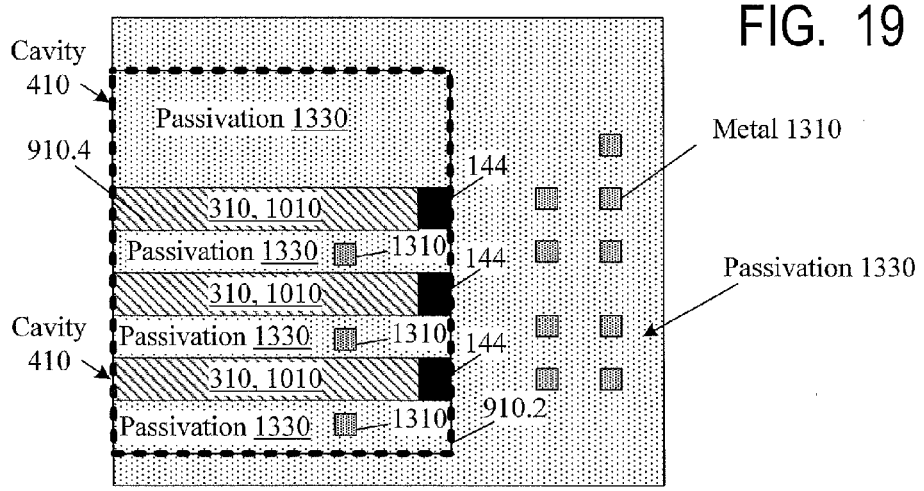
Figure 20:
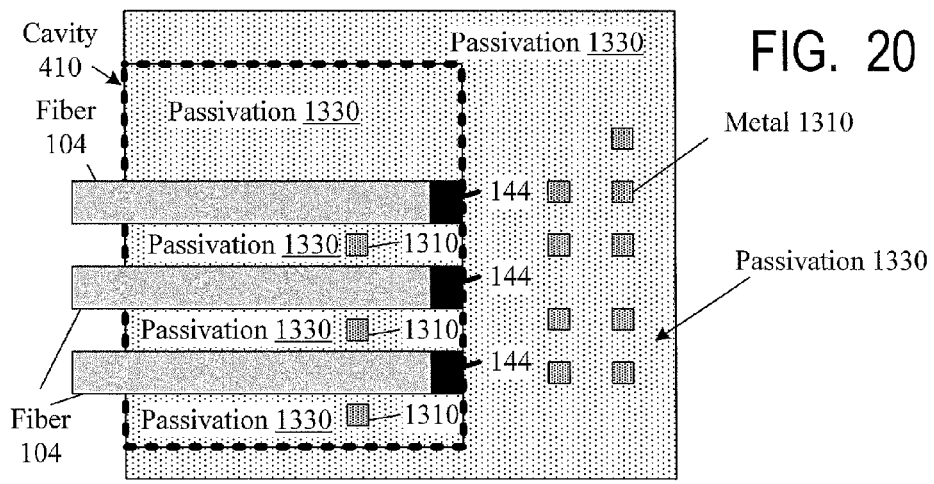
FIG. 20 is a top view of an optical interposer with fibers according to some embodiments of the present invention.
Figure 21:
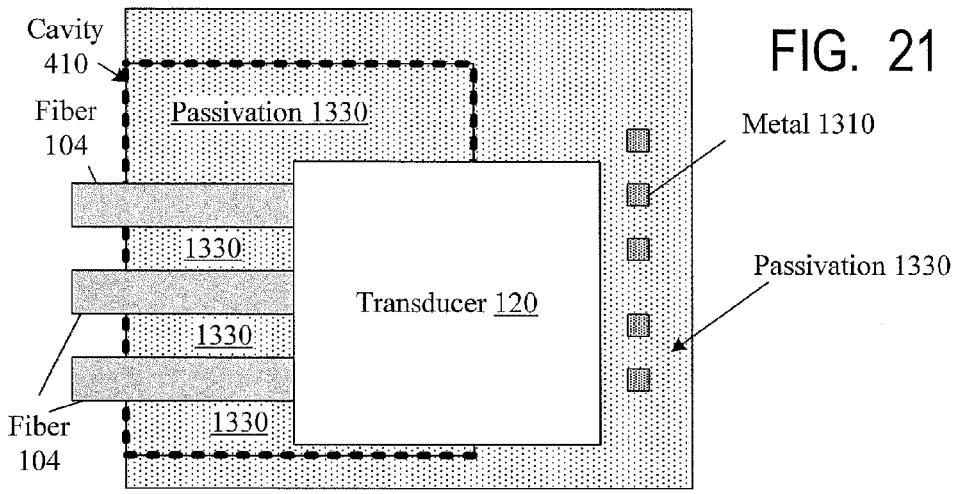
FIG. 21 is a top view of a module with an optical interposer according to some embodiments of the present invention.
Figure 22:
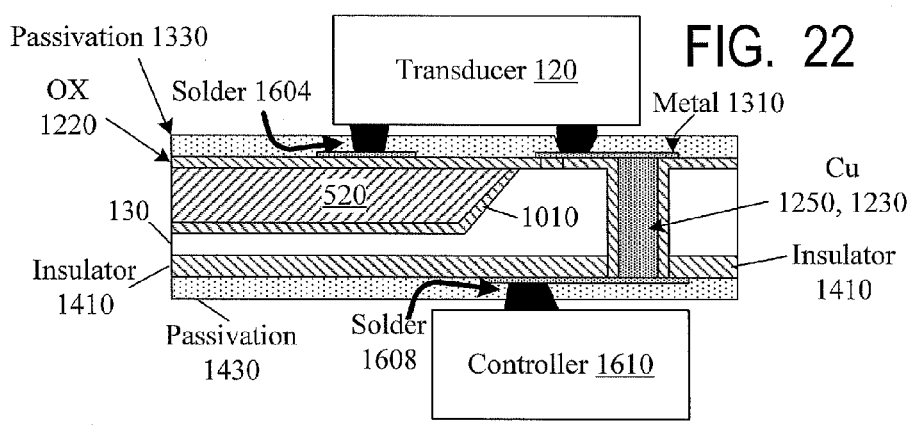
FIGS. 22, 23 show vertical sections of modules with optical interposers according to some embodiments of the present invention.
Figure 23:
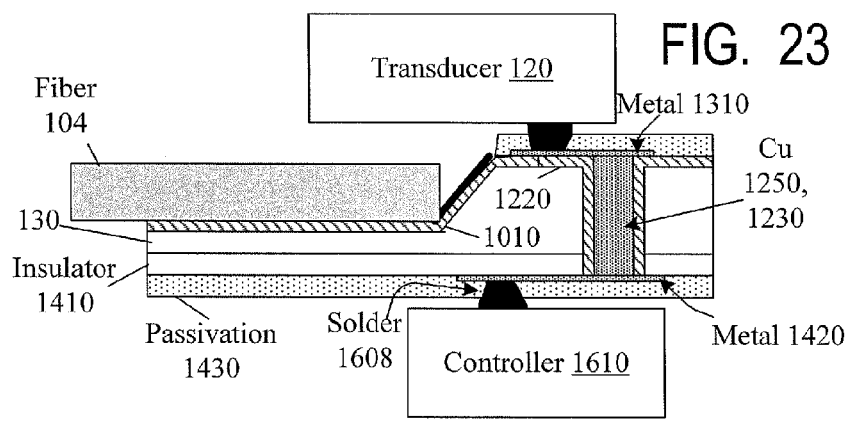

Then the wafer is diced. In the embodiment of FIG. 18, the left sidewall 910.4 of cavity 410 is on a dice line, so the sidewall 910.4 is removed. See FIG. 19. The grooves 310 become exposed on the left for fiber insertion. Fibers 104 are inserted into the grooves as shown in FIG. 20. Transducer 120 and possibly other circuits are connected to the interposer (to metal contacts 1310, 1420). In the exemplary embodiment of FIGS. 21-23, transducer 120 is flip-chip attached to the top contacts 1310 of the interposer with solder 1604 or some other means, and controller 1610 is flip-chip attached to the bottom contacts 1420 with solder 1608 or some other means. FIG. 21 is the top view; FIG. 22 shows a longitudinal cross section along a spacer 520/1220/1330 between adjacent grooves 310; FIG. 22B shows a cross section along a fiber 104. Multiple transducers, controllers, and other integrated circuits and discrete circuit elements can be connected to the interposer. As seen in FIG. 22, solder 1604 is also placed on metal 1310 over polysilicon spacers 520 to provide mechanical support for supporting cantilevered transducer chip or chips 120 or other circuits that may overly the cavity 410. The transducer size can therefore be increased without increasing the stress on the transducer and without increasing the overall area of the module.

The module can be mounted on a PCB or in any other desired way.

Figure 24:
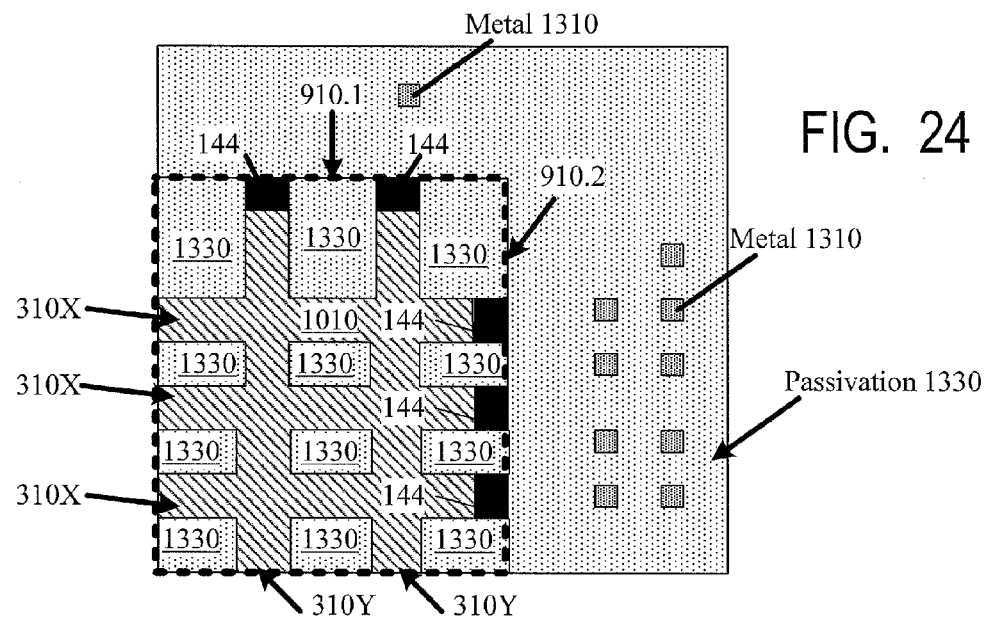
FIG. 24 is a top view of an optical interposer according to some embodiments of the present invention.
Figure 25:
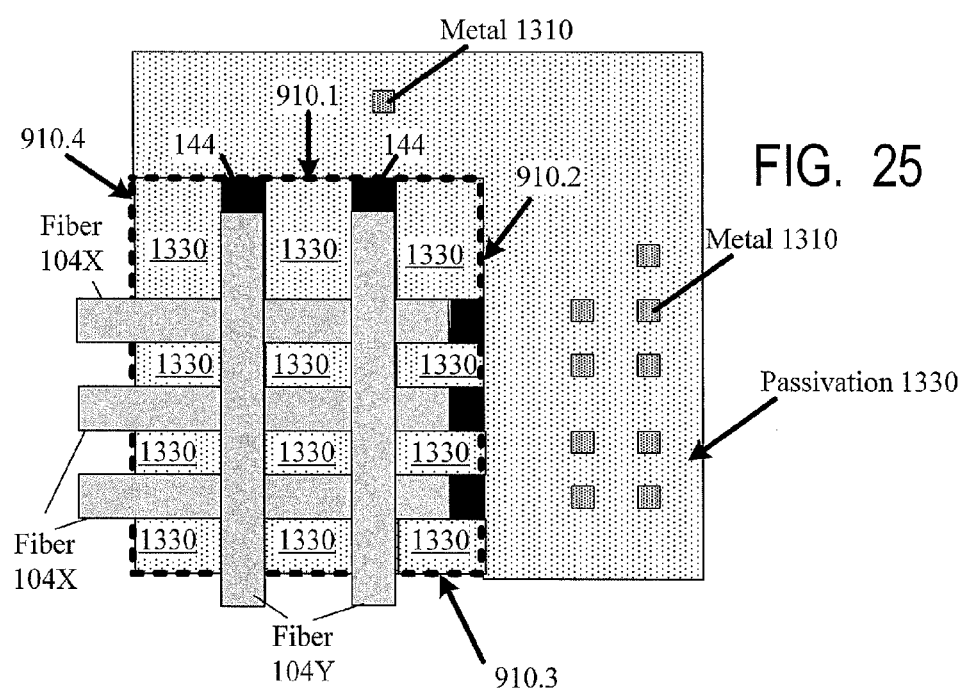
FIG. 25 is a top view of an optical interposer with fibers according to some embodiments of the present invention.
Figure 26:
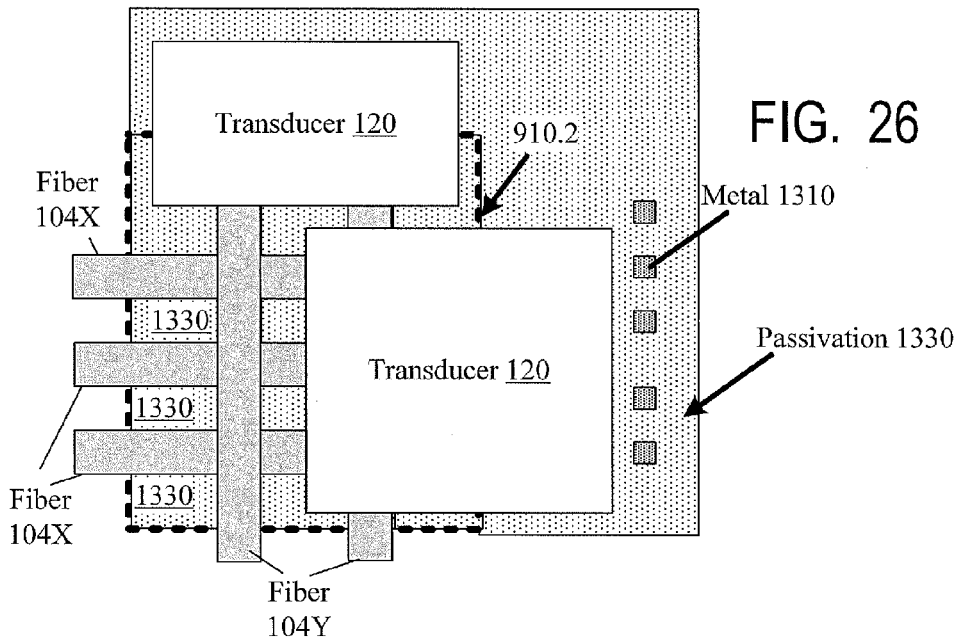
FIG. 26 is a top view of a module with an optical interposer according to some embodiments of the present invention.

To reduce thermal stresses during fabrication and operation, the materials used in the interposer should preferably have similar thermal expansion coefficients, e.g. substrate 130 can be monocrystalline silicon and spacers 520 can be polysilicon. Also, to reduce thermal and other mechanical stresses during operation, each spacer 520 can be made discontinuous and/or hollow. In addition, discontinuous spacers can define multiple channels overlying each other, as illustrated in FIG. 24 (top view without fibers and transducers), FIG. 25 (top view with two layers of fibers 104 but without transducers), and FIG. 26 (top view with two layers of fibers 104 and two transducers 120). In FIGS. 25 and 25, contacts 1310 between the grooves are not shown for simplicity. Grooves 310X and fibers 104X run in the X direction (horizontally in the view of FIGS. 24-26) between the spacers. Grooves 310Y and fibers 104Y run in the Y direction over the fibers 104X. Mirrors 144 on side 910.2 are for the bottom fibers 104X. Mirrors 144 on side 910.1 are for the top fibers 104Y. Cavity sidewalls 910.3, 910.4 are removed during dicing or at some other processing stage.

Figure 27:
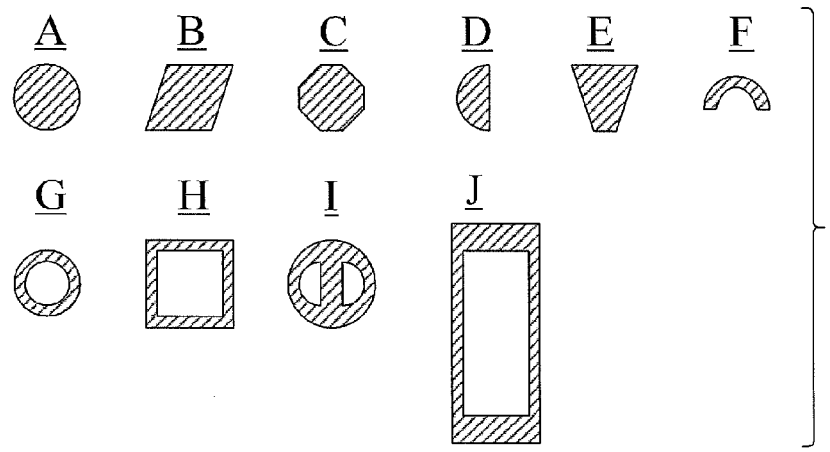
FIG. 27 shows possible spacer shapes in top view for optical interposers according to some embodiments of the present invention.

Discontinuous spacers are less vulnerable to thermal stresses. They can be formed of metal or other materials. They may have any desired shape. FIG. 27 shows some non-limiting examples in top view: A (round spacer), B (parallelogram), C (hexagon), D (half-circle), E (trapezoid), F (half-ring), G (full ring), H (hollow rectangle), and I (hollow circle with a diameter). Spacer J is another hollow rectangle, but the spacer is continuous, i.e. running through the whole cavity. Other shapes can also be used. In side view, the spacers' sidewalls can be vertical or inclined, and can have conical or other shapes.

Figure 28:
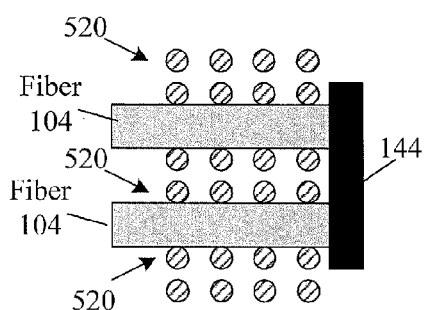
FIG. 28 is a top view showing some features of an optical interposer with fibers according to some embodiments of the present invention.

In FIG. 28 (top view), spacers 520 between each pair of fibers 104 form a double row of discontinuous spacers. Mirrors 144 can optionally be patterned to be a continuous layer on the cavity sidewall if the spacers do not overly the sidewall. The continuous mirror layer can also be provided for continuous spacers.

Figure 29:
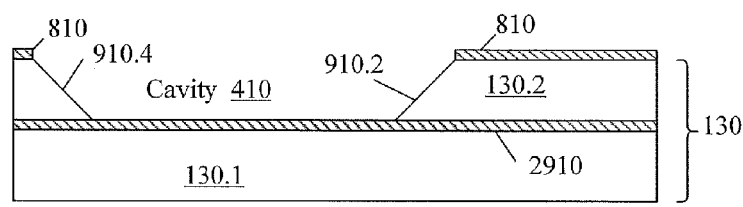
FIGS. 29, 30 show vertical cross sections of optical interposers during fabrication according to some embodiments of the present invention.
Figure 30:
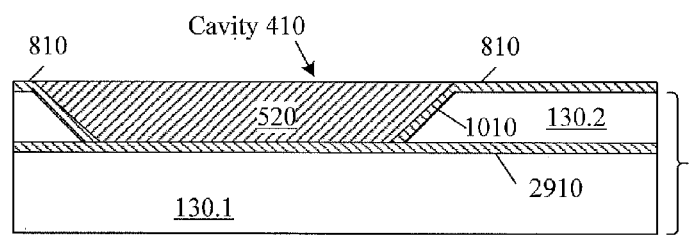

FIGS. 29-30 illustrate use of SOI (silicon on insulator) substrate 130, having monocrystalline silicon layers 130.1, 130.2 separated by planar insulating layer 2910. The fabrication process is similar to the processes described above. FIGS. 29-30 show the same views, and the same stages of fabrication, as respective FIGS. 8, 11. The etch of cavity 410 stops on insulator 2920, and so will the etch of grooves 310 (described above in connection with FIG. 17B). Highly controllable cavity depth is achieved. In some embodiments, layer 130.2 has (100) orientation, and the cavity etch is a KOH wet etch described above.

Figure 31:
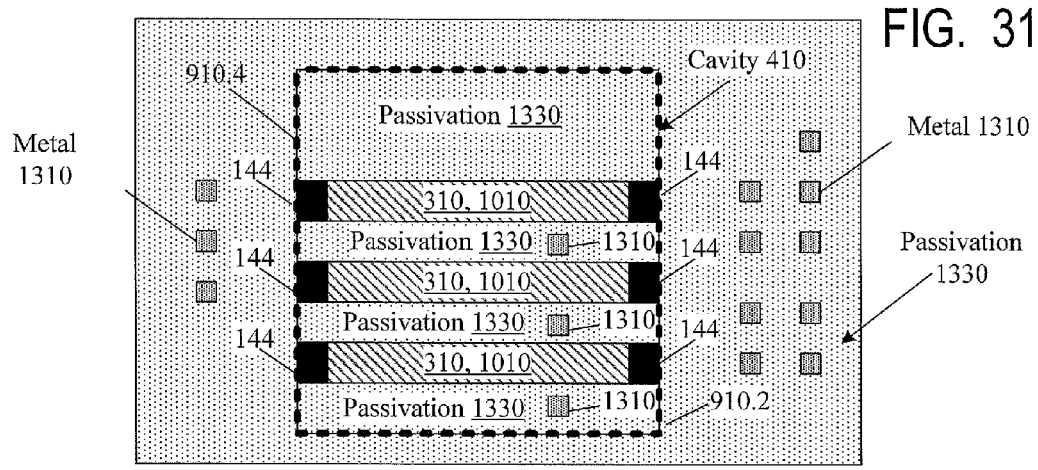
FIG. 31 is a top view of an optical interposer according to some embodiments of the present invention.

Some interposer embodiments are used for optical coupling between different transducers mounted on the same interposer. For example, FIG. 31 is similar to FIG. 18, but mirrors 144 are formed at the groove ends on cavity sidewalls 910.2, 910.4. Transducers (not shown) can be mounted on the interposer over all these mirrors, and can be optically coupled to each other by the optical fibers 104. Likewise, in a variation of FIG. 24, mirrors and transducers can be provided on all the four cavity sides 910.1-910.4.

A single transducer chip may have both light emitters and photodetectors. The grooves can be curved in the top and/or side views, and can have a varying width. The mirrors 144 can be absent since mirrors can be etched into fibers' end faces as described in U.S. Pat. No. 8,031,993 issued Oct. 4, 2011 to Bowen. The mirrors 144, when present, can be planar as described above, or can be elliptic or have other shapes. Non-mirror optical elements (e.g. prisms, etc.) can also be used.

Figure 32:
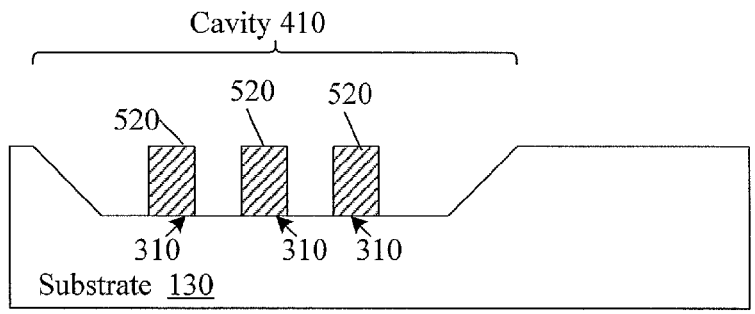
FIGS. 32, 33, 34, 35A, 35B, 35C, 35D, 35E, 35F, 36, 37, 38, 39A, 39B, 39C show vertical cross sections of optical interposers during fabrication according to some embodiments of the present invention.
Figure 33:
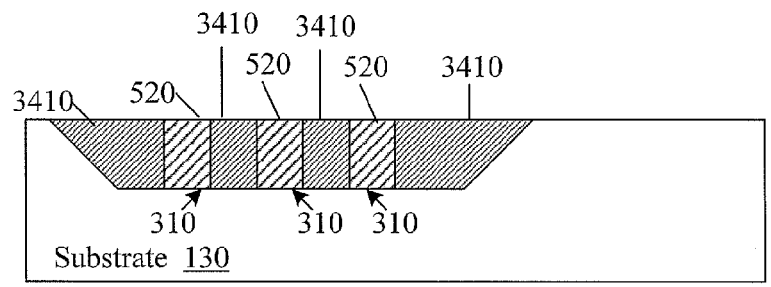
Figure 34:
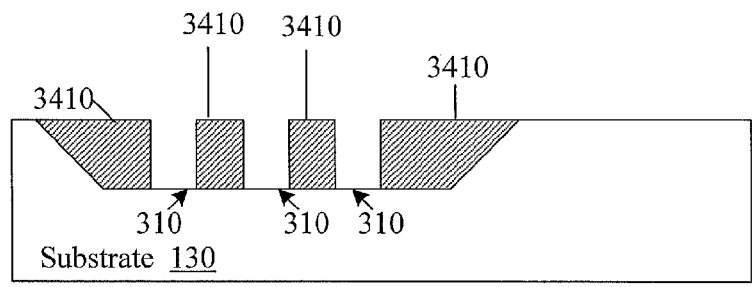

The spacers can be formed by a subtractive method as shown in FIGS. 32-34. FIG. 32 is similar to FIG. 6, but layer 520 is patterned to remain at the groove locations, i.e. in regions complimentary to the spacer locations. The patterning uses a selective etch as described above. Then the spaces between features of layer 520 are filled with a material 3410 (FIG. 33). This can be any material suitable for the spacers, deposited by any suitable process, e.g. metal deposited over the wafer and then etched off to provide a planar top surface. Other techniques can also be used, e.g. electrodeposition on a seed layer (not shown) formed in the cavity before deposition of layer 520. Then layer 520 is etched away selectively to layer 3410 (FIG. 34) to form the grooves 310. Layer 3410 provides the spacers between the grooves. The subtractive method can be used with an etch-stop layer such as 1010 (FIG. 17B) and can be combined with other features described above.

Figure 2:
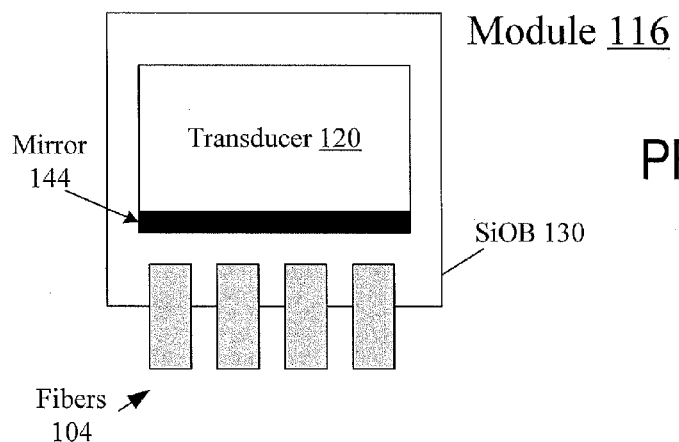
FIG. 2 is a top view of a part of the system of FIG. 1.
Figure 3:
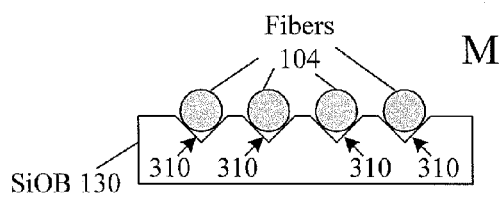
FIG. 3 shows a vertical cross section of a part of the system of FIG. 1.
Figure 4:
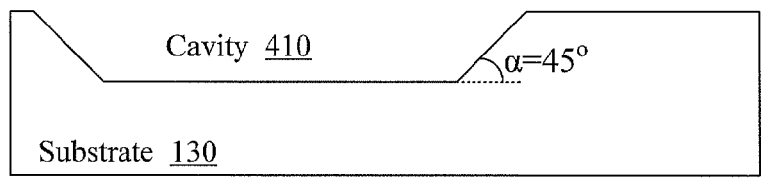
FIGS. 4-6 show vertical cross sections of optical interposers during fabrication according to some embodiments of the present invention.

In some embodiments, grooves with optical fibers are provided both at the top and bottom surfaces of the interposer. The grooves at each surface can be formed using any techniques described above, including the prior art techniques described in connection with FIGS. 1-3. One exemplary process is as follows. Substrate 130 is thinned to its final thickness. Then V-grooves or other grooves are etched in substrate 130 on both sides, possibly at the same time with a wet etch. Then each side is processed, possibly as the top side in FIG. 1-3, to finish the interposer fabrication.

Figure 35A:
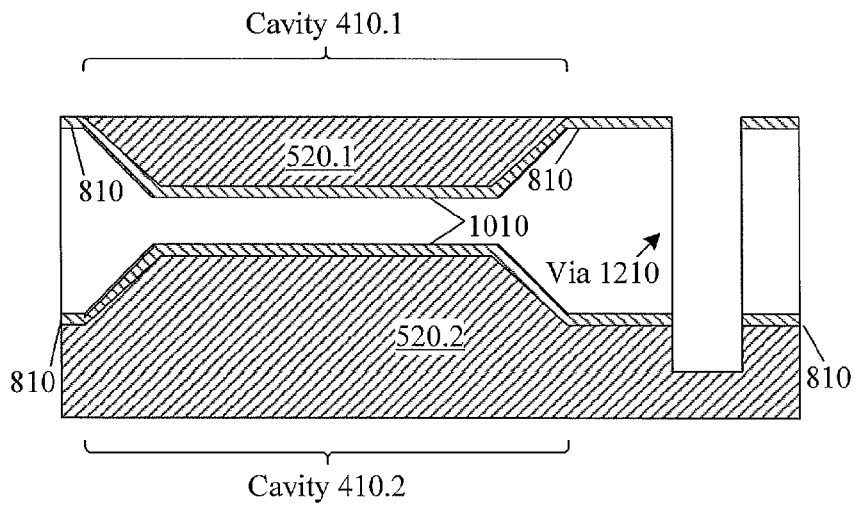

In some embodiments, the interposer is formed as follows. Substrate 130 is thinned to its final thickness. Then cavities 410.1, 410.2 (FIG. 35A) are etched respectively in the top and bottom surfaces of the substrate, possibly simultaneously, using the processes described above or any other suitable processes. In FIG. 35A, a mask 810 is used on the top and bottom to define the two cavities. (There can be any number of cavities on the top and bottom, possibly a different number of cavities on the top than on the bottom, and the cavities on the top do not have to overlie the bottom cavities and do not have to be aligned in any way.) Etch stop layer 1010 is formed on the top and bottom surfaces, possibly simultaneously (e.g. by thermal oxidation of silicon or by CVD), as described above. Then layer 520 is formed on the top and bottom surfaces of the wafer using the techniques described above or other techniques. This layer is shown as 520.1 on the top surface, and as 520.2 on the bottom surface. The top layer 520.1 is planarized as in FIG. 11, to be removed outside of cavity 410.1. The bottom layer may also be planarized, but it covers the whole bottom surface of the wafer. The thickness is chosen to accommodate the through-substrate-via process described below, and can be any suitable value.

Then a blind via 1210 is formed in the top surface of the wafer by a masked etch of layer 810 and substrate 130 at each location of a desired through-substrate via as described above in connection with FIG. 12. Via 1210 passes through substrate 130 and through layer 810 above and below the substrate and partially, but not completely, passes through layer 520.2.

Figure 35B:
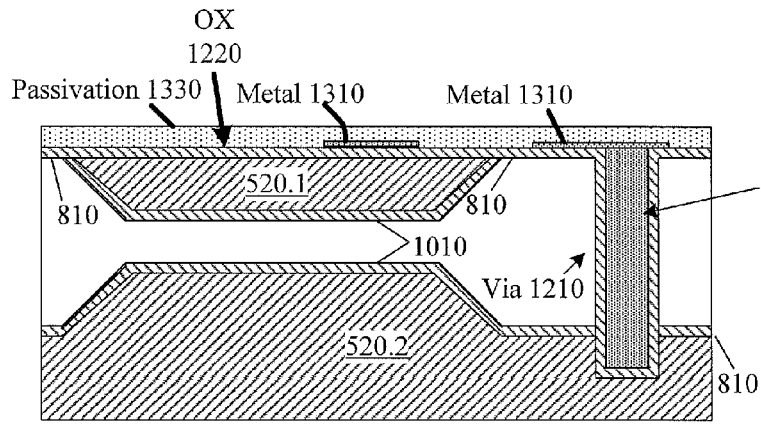

As shown in FIG. 35B, vias 1210 are then oxidized and metalized, and conductive lines 1310 and possibly other circuit elements and passivation 1330 are formed on top of the interposer, using processes described above in connection with FIGS. 12-13.

Figure 35C:
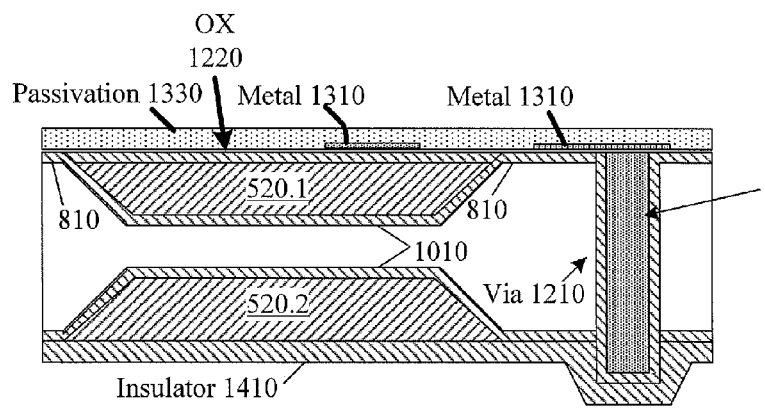

Then (FIG. 35C) the interposer is thinned, by CMP or other processes, to remove the layer 520.2 down to the level of oxide 1010 at the interposer bottom. Vias 1220 become through holes. Copper 1250 (and seed 1230) and insulator 1220 protrude down from substrate 130. Then insulator 1410 (e.g. polyimide) is deposited on the bottom surface, and the bottom surface is planarized by CMP which does not remove all of insulator 1410 but exposes the copper. Suitable processes are described above in connection FIGS. 14-15.

Figure 35D:
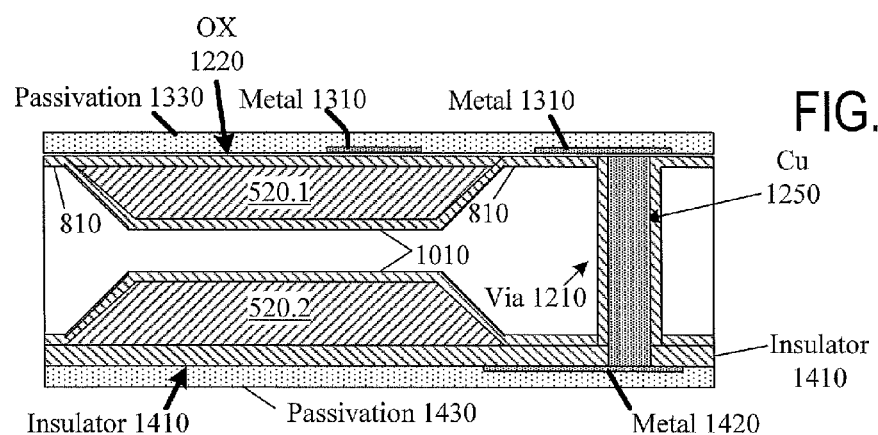

Conductive lines 1420 and other circuit elements and passivation 1430 are formed on the interposer bottom as described above in connection with FIGS. 15-16 and illustrated in FIG. 35D.

Figure 35E:
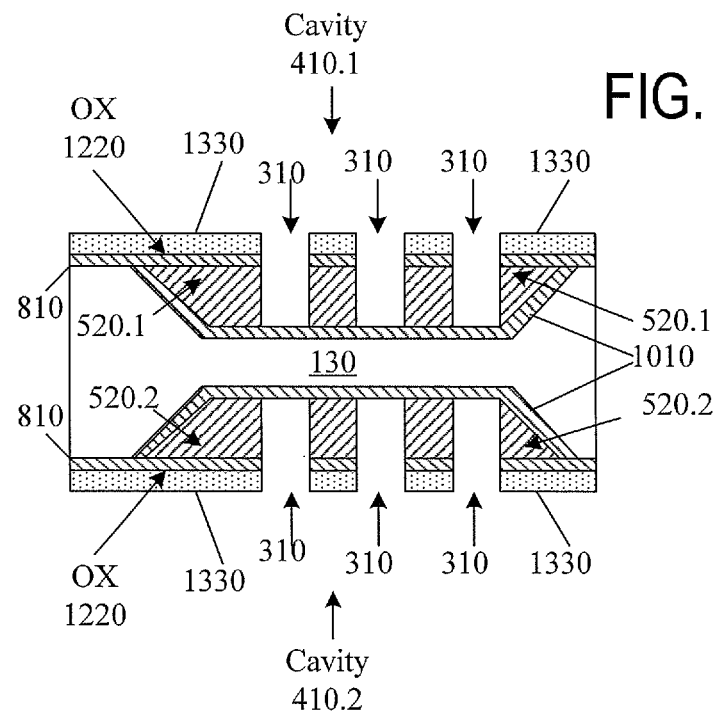

Layers 520.1, 520.2 are etched to form grooves 310 and the interposer top and bottom, and mirrors 410 are formed at the top and bottom, as described above in connection with FIGS. 17A, 17B, 18. FIG. 35E shows an exemplary vertical cross section perpendicular to grooves 310. The cavities 410.1, 410.2 do not have to be aligned, i.e. cavity 410.1 can be laterally shifted relative to cavity 410.2. The grooves 310 also may have different shapes and dimensions. More than one cavity can be provided on top and/or bottom, and the top grooves 310 do not have to be parallel to the bottom grooves.

Figure 35F:
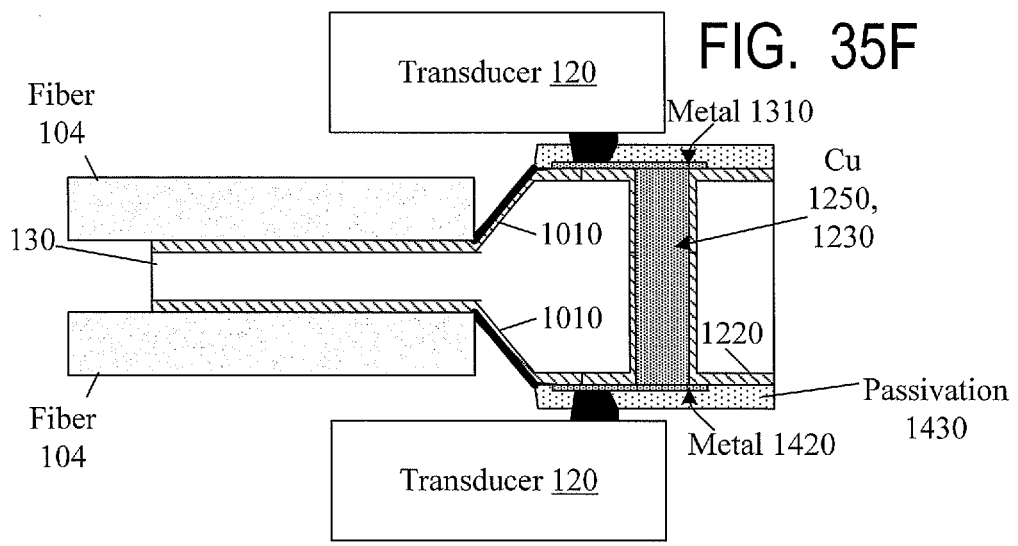
Figure 36:
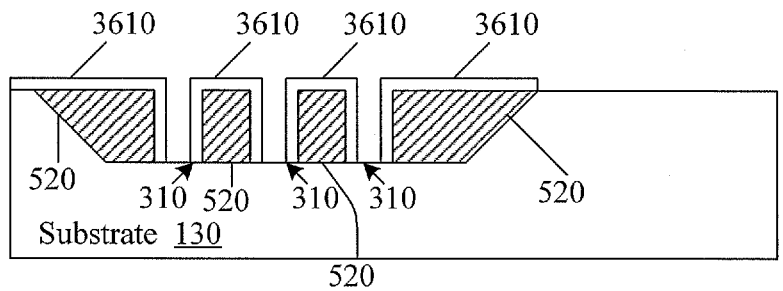

The structure is further processed as described above in connection with any of FIGS. 19-26, and any variations in the top or bottom processing can be used as described above in connection with FIGS. 1-34. (In particular, prior art techniques for groove and mirror formation can be used on one or both interposer sides.) FIG. 35F shows an exemplary structure at a stage similar to FIG. 23, with transducers 120.1, 120.2 on top and bottom respectively. In this embodiment, the two transducers are connected to each other through a metalized via 1210, but this is not necessary. Different transducers can be connected to different vias, or not connected to any vias, and controllers 1610 (FIG. 22) and other circuits can be mounted on the interposer as needed.

In some embodiments, the through vias 1210 are created without first forming blind vias, i.e. the vias 1210 are etched through the interposer wafer right away. Also, the invention is not limited to through vias.

Figure 39A:
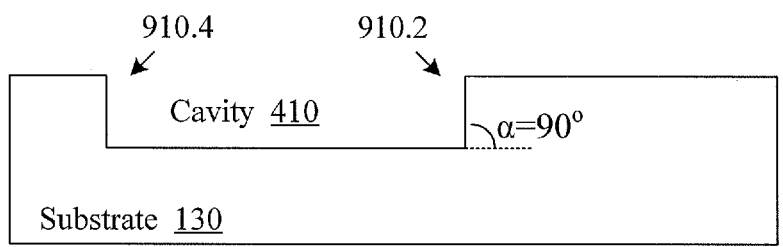
Figure 39B:
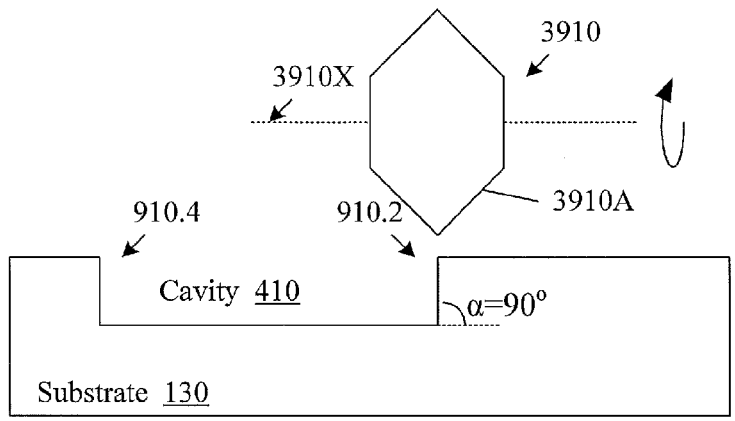
Figure 39C:
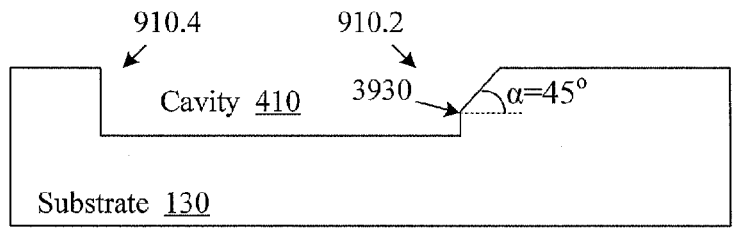
Figure 40:
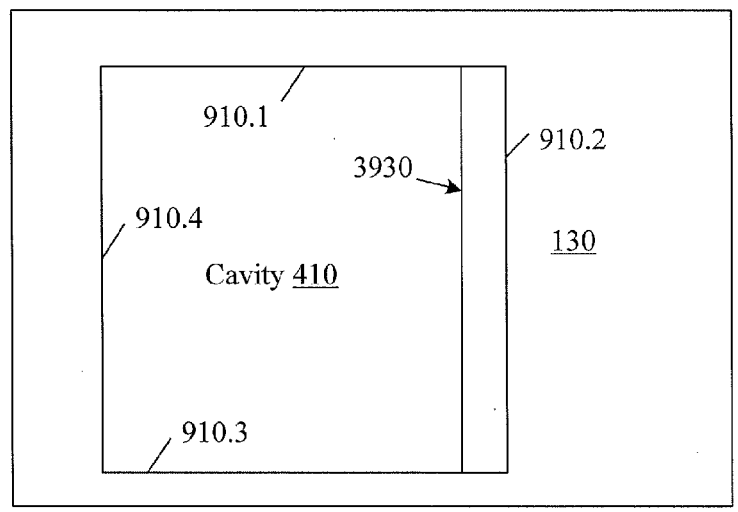
FIG. 40 is a top view of an optical interposer during fabrication according to some embodiments of the present invention.

A wide variety of cavity shapes are possible to meet the requirements of a particular application. For example, the "mirror" sidewall 910.2 can be formed by a separate etch or other process. In particular, the minor sidewall 910.2 can be at a different angle and/or depth than sidewalls 910.1, 910.3, 910.4 of the cavity. One possible process is illustrated in FIGS. 39A-39C. This process is suitable for a wide variety of substrate materials including monocrystalline silicon and other materials described above. Initially (FIG. 39A), cavity 410 is formed with all the sidewalls being vertical or at some other angle. In some embodiments, the cavity is formed by a masked dry etch with a photoresist mask (not shown, similar to mask 810 in FIG. 8). Then (FIG. 39B) the photoresist is removed, and sidewall 910.2 is etched to change its geometry. Other sidewalls of the cavity may or may not be similarly processed, and either an entire sidewall or only part of a sidewall may be so processed. In the embodiment shown, the geometry of sidewall 910.2 is defined by mechanical machining, and more particularly using a dicing saw 3910 having a 45° sidewall 3910A facing the sidewall 910.2. Saw 3910 rotates around a horizontal axis 3910X perpendicular to sidewall 910.2 to change the sidewall geometry. Sidewall 910.2 acquires a 45° profile matching the saw sidewall 3910A. See FIG. 39C (vertical cross section) and FIG. 40 (top view).

Subsequent steps can be as described above and below in connection with FIGS. 1-38. In particular, the cavity can be filled with layer 520, possibly after deposition of layer 1010, and such cavities can be formed both at the top and the bottom of substrate 130 by the process of FIGS. 39A-39C or other processes.

Figure 41:
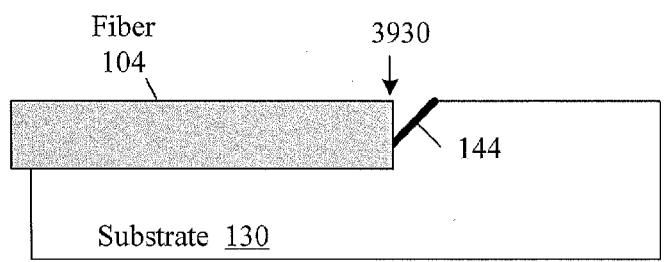
FIGS. 41, 42 show vertical cross sections of optical interposers according to some embodiments of the present invention.

In some embodiments, the sawing or other processing of sidewall 910.2 (FIG. 39B) is performed to a controlled depth, and in the embodiment of FIG. 39C the depth is less than the depth of cavity 410. This results in a step 3930 along the cavity sidewall 910.2. This step can be used as a hard stop for fibers 104 to facilitate the fiber alignment as shown in FIG. 41—the fibers are inserted in grooves 310 so that they abut the step 3930. (For simplicity, FIG. 41 does not show oxide 1010 and other features that may or may not be present as in FIGS. 4-38.) If desired, the mirror sidewall 910.2 can be deeper than the rest of the cavity, or can be of the same depth.

Figure 42:
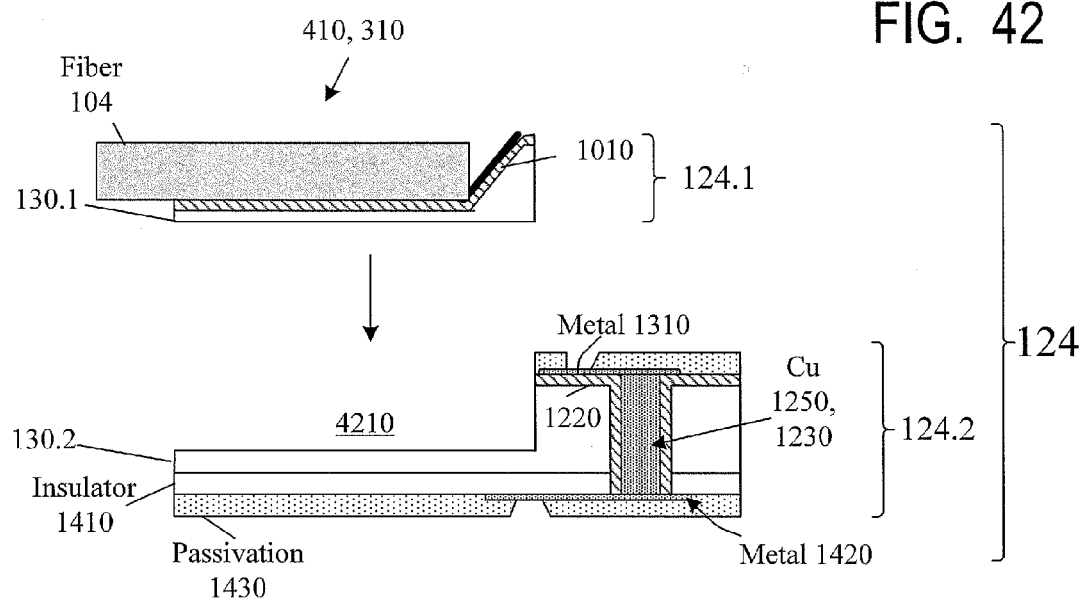
Figure 43:
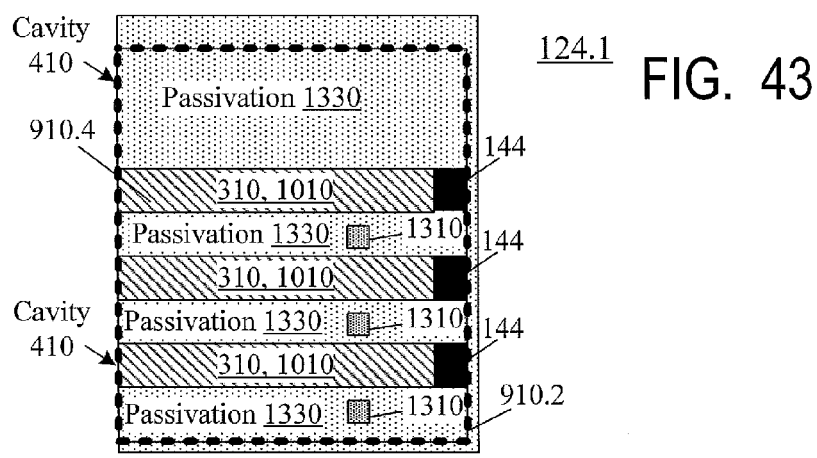
FIG. 43 is a top view of an optical interposer during fabrication according to some embodiments of the present invention.

As illustrated in FIG. 42, the cavity with grooves 310 and the electrical circuitry can initially be formed in separate wafers, shown as interposers 124.1 and 124.2, which are then assembled into a single optical interposer 124. An exemplary fabrication process is as follows. Optical interposer 124.1 is fabricated by processing a substrate 130.1 (monocrystalline silicon or other suitable material) as in FIGS. 8-19 to form cavity 410 and grooves 310 and mirrors 144, but without electrical circuitry outside the cavity 410. Oxide 1220, metal 1310, and passivation 1330 may be present in interposer 124.1 in the cavity area as in FIGS. 17A-19. Circuit elements and pads of metal 1310 can thus be formed in the cavity area. Then the wafer is thinned and diced to obtain a structure containing the cavity as shown in top view in FIG. 43. One or more sidewalls may (but does not have to) be removed in the dicing process as described above in connection with FIG. 19. Process variations can be used as described above, including the variation of FIGS. 39A-39C.

In a separate process, interposer 124.2 is fabricated by processing a substrate 130.2 (monocrystalline silicon or other suitable material) to form electrical circuitry for connection to transducers and other circuits. The wafer processing can be as described above in connection with FIGS. 12-16. A cavity 4210 is formed in substrate 130.2. Optical interposer 124.1 is inserted into this cavity. Fibers 104 can be inserted in grooves 310 and suitably affixed (e.g. with adhesive) before or after the attachment of interposer 124.1 to interposer 124.2. Transducers and other circuits can be attached to combined interposer 124 as described above.

Interposer 124.1 may have discontinuous spacers and/or minors 144 on different sidewalls as FIGS. 24-26, and interposer 124.1 or 124 may have other features described above in connection with FIGS. 4-41. In particular, in some embodiments, interposer 124.2 has cavities 4210 on top and bottom, and a separate interposer or interposers 124.1 are inserted into each cavity.

The invention is not limited to the features described above. In some embodiments, an optical interposer (e.g. 124 or 124.1) comprises a top surface having a first cavity therein. For example, the first cavity can be 410 in FIG. 4, or can be the cavity defined by layer 1010 in FIG. 10 or in interposer 124.1 of FIG. 42, i.e. the cavity whose surface is the top surface of layer 1010. Alternatively, the first cavity can be defined by layer 1010 in cavity 410.1 or 410.2 of FIG. 35A. The first cavity may have sidewalls all around (as in FIG. 31) or some sidewalls may be removed (as in FIG. 19 or 24), i.e. the first cavity may be at an edge of the interposer.

The optical interposer also comprises one or more first spacers (e.g. 520, or 3410, or a combination of 520 (or 520.1 or 520.2) and 1220 in FIG. 17B or 35E, with or without 1330). The one or more first spacers are on a surface of the first cavity. The one or more first spacers define a plurality of first channels for supporting optical fiber cables. The channels can be grooves 310, or grooves 310X and 310Y in FIG. 24, or other channels. Different channels can run in different directions as in FIG. 24, perpendicular or at some other angle to each other.

Each first spacer comprises a bottom region physically contacting the first cavity's surface and made of a different material than at least part of the first cavity's surface. The bottom region can be a spacer 520 or 520.1 or 520.2, and the first material can be polysilicon. The bottom region can also be less than a whole spacer. For example, in FIG. 36, layer 520 is covered by a layer 3610 made of a different material than 520, possibly of the same material as the cavity surface, and each first spacer can be viewed as made of layers 520, 3610 to define grooves 310 therebetween. For example, layer 3610 can be formed by selective deposition (e.g. thermal oxidation of polysilicon 520), or can be deposited to a greater thickness on top of layer 520 than on the cavity bottom and can be anisotropically etched until it is removed from the cavity bottom, or layer 3610 can be left on the cavity bottom (this is not shown in FIG. 36). The bottom region of each first spacer can be the region 520 made of a different material than the cavity surface. In FIGS. 6 and 17B, the bottom region can be an entire spacer 520 which contacts a different material 1010 (FIG. 17B) or 130 (FIG. 6).

In some embodiments, the first cavity's surface comprises:
a bottom surface; and
a sidewall surface comprising one or more sidewall portions extending from the bottom surface upward and laterally outside of the first cavity. For example, in FIG. 18, the sidewall surface can be 910.2, and the sidewall portions can be the oxide sidewall portions underlying the metal minors 144.

Each first channel has a first end which is adjacent to an associated one of the one or more sidewall portions, each sidewall portion being for providing and/or supporting an optical element (e.g. a minor 144, or a prism (not shown), or some other optical element) for directing light coming into and/or out of the first channel's respective optical fiber cable. For example, in FIGS. 18, 42, 43 the first end of each channel is the end adjacent to the corresponding mirror 144.

In some embodiments, for at least one first spacer, the bottom region overlies and physically contacts the first cavity's bottom surface and is made of a different material than at least part of the first cavity's bottom surface adjacent to the bottom region. In some embodiments, for at least one first spacer, the bottom region overlies and physically contacts the first cavity's sidewall surface and is made of a different material than at least part of the first cavity's sidewall surface adjacent to the bottom region. For example, in FIGS. 17A and 17B, the bottom region 520 of each spacer overlies and physically contacts both the bottom surface and the sidewall surface 910.2 supporting the mirrors, the bottom and sidewall surfaces are made of a different material (e.g. polysilicon) than the cavity's surface (made of silicon dioxide for example).

In some embodiments, each optical element is a reflective surface (e.g. mirror 144) formed on the associated sidewall portion, the reflective surface being for reflecting light coming into and/or from a respective optical fiber cable in the first channel, the reflective surface having a different reflectivity property than at least one surface of the first cavity. For example, mirror 144 may be metal having a different reflective property than the silicon dioxide surface of the cavity. In other embodiments, the mirrors are provided by the cavity's sidewall surface, not by a separate layer (e.g. metal) on the cavity surface.

In some embodiments, the first cavity's bottom surface is planar, and each reflective surface is a flat surface being at an angle of 45° or some other angle at most 60° to the first cavity's planar bottom surface. (This angle is defined as the angle between the reflective surface and an imaginary extension of the planar bottom surface beyond the reflective surface—see e.g. angle α in FIG. 4).

In some embodiments, at least one sidewall of at least one first spacer is at an angle 90° or some other angle of at least 85° to the first cavity's planar bottom surface.

Figure 37:
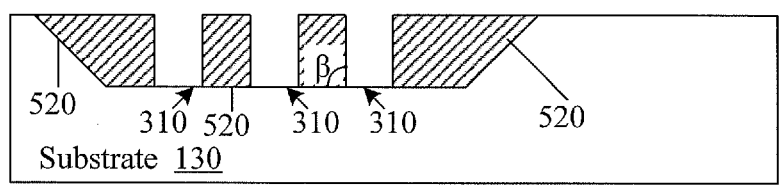

(This angle is defined as the angle between the first spacer's sidewall and the planar bottom surface underneath the first spacer—see e.g. angle β in FIG. 37).

In some embodiments, the interposer comprises a substrate and a layer on the substrate (e.g. 1010) of a different material than the substrate and than the bottom region of each first spacer. The layer's top surface provides the first cavity's surface.

In some embodiments, the channels comprise at least two channels running in different directions and overlying one another. See FIG. 24 for example.

In some embodiments, the optical interposer comprises one or more pads over the first spacers, for providing mechanical support to an integrated circuit mounted on the interposer. For example, in FIGS. 16 and 22, a pad 1310 over spacers 520 is used to support solder 1604 which supports the transducer 120.

Figure 38:
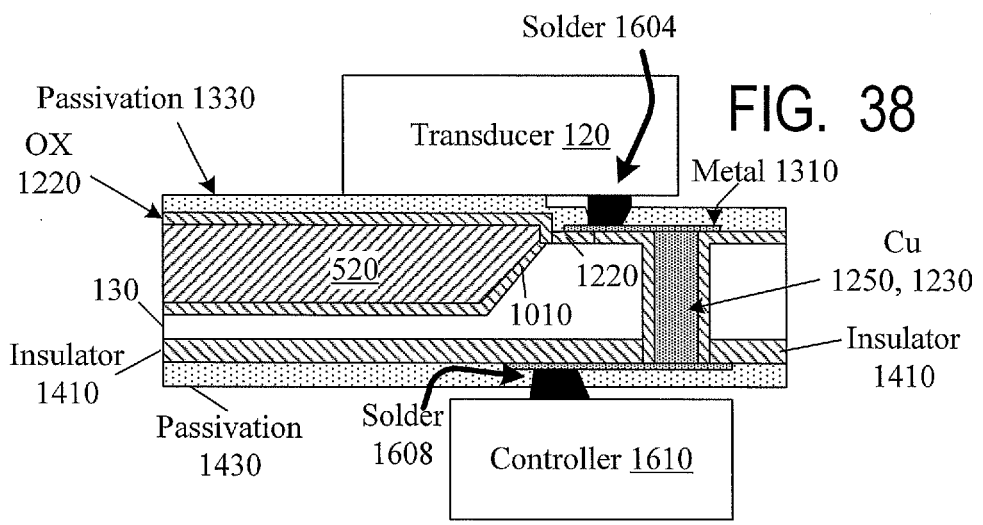

In some embodiments, at least one first spacer protrudes upward to provide mechanical support for at least one of the transducers. One example illustrated in FIG. 38, showing a structure similar to FIG. 22 but without the metal 1310 and solder 1604 over the cavity. Transducer 120 rests on passivation 1330 above spacer 520. For example, at the stage of FIG. 11, layer 520 can be left to protrude upward above substrate 130. Layer 520 can then be etched off outside the cavity as needed to form the electrical circuitry. The upward protrusion of layer 520 at the cavity will result in the upward protrusion of passivation 1330 over the cavity.

Alternatively, the upward protrusion of passivation 1330 can be provided by patterning passivation 1330 and/or insulation 1220, and/or depositing and patterning other layers by conventional techniques.

In some embodiments, electrical circuitry is formed in at least one of the first spacers (e.g. transistors, interconnect lines, and other circuitry can be formed in spacers 520).

In some embodiments, the optical interposer further comprises a bottom surface having one or more second channels defined therein for supporting optical fiber cables (see e.g. FIG. 35F), the electrical circuitry comprising circuitry for connection to one or more opto-electrical transducers which are for being optically coupled to the optical fiber cables supported by the second channels.

In some embodiments, the optical interposer's bottom surface comprises a second cavity therein. The optical interposer also comprises, when viewed upside down (i.e. with the bottom surface on top), one or more second spacers on the second cavity's surface which define a plurality of the second channels. Each second spacer comprises a bottom region physically contacting the second cavity's surface and made of a different material than at least part of the second cavity's surface.

Some embodiments provide an optical interposer for interfacing one or more optical fiber cables to electrical circuitry, the optical interposer comprising a top surface having a first cavity therein. The optical interposer also comprises one or more spacers on a surface of the first cavity, wherein the one or more spacers define a plurality of first channels for supporting optical fiber cables. The optical interposer comprises electrical circuitry outside the first cavity, for connection to one or more opto-electrical transducers each of which is for being optically coupled to the optical fiber cables. For each first channel, the first cavity comprises a first surface at the end of the first channel (e.g. the surface on which the mirrors 144 are formed), the first surface being at an angle of at most 60° to the first cavity's planar bottom surface (the angle being between the first surface and an imaginary extension of the planar bottom surface beyond the first surface. At least one sidewall of at lest one spacer is at an angle of at least 85° to the first cavity's planar bottom surface (the angle being between the spacer's sidewall and the planar bottom surface underneath the spacer).

Some embodiments provide a method for fabricating an optical interposer. The method comprises: forming a first cavity (e.g. 410.1 or 410.2) in a substrate; forming a first layer (e.g. 520 or 520.1 or 520.2) over the first cavity's bottom surface; and patterning the first layer to form one or more spacers in the first cavity, wherein the one or more spacers define a plurality of channels for supporting optical fiber cables. The spacers could be formed by the first layer (e.g. 520) or by another layer (e.g. 3410).

Patterning the first layer comprises a first etch of the first layer, wherein at least over the first cavity's surface, the first etch terminates based at least in part on etch selectivity to the first cavity's surface.

In some embodiments, the first cavity comprises: a bottom surface; and a sidewall (e.g. 910.2) extending from the bottom surface upward and laterally outside of the first cavity. At least over the first cavity's sidewall, the first etch terminates based at least in part on etch selectivity to the sidewall.

Some embodiments provide an optical interposer for interfacing one or more optical fiber cables to electrical circuitry, the optical interposer comprising a first surface and a second surface opposite to the first surface (for example, the top and bottom surfaces in FIG. 35F). The first surface comprises one or more first channels for supporting one or more optical fiber cables. The second surface comprises one or more second channels for supporting optical fiber cables. The optical interposer comprises electrical circuitry for connection to a plurality of opto-electrical transducers which are for being optically coupled to the optical fiber cables.

In some embodiments, the optical interposer comprises a substrate (e.g. 130), and the plurality of channels are formed in recesses in opposite surfaces of the substrate. For example, in FIG. 35F, the recesses are defined by the top surface of layers 1010 in cavities 410.1, 410.2. Alternatively, the recesses could be individual V-grooves as in FIGS. 1-3.

In some embodiments, the optical interposer comprises electrical circuitry at the first and second surfaces, and comprises one or more conductive paths passing through the substrate (e.g. metalized vias 1210) for interconnecting electrical circuitry at the first surface and electrical circuitry at the second surface.

Other embodiments and variations are within the scope of the invention, as defined by the appended claims.

The invention claimed is:

1. An optical interposer for interfacing a plurality of optical fiber cables to one or more opto-electrical transducers which are for being coupled to the one or more optical fiber cables, the optical interposer comprising a body comprising a top surface having a first cavity therein;
   wherein the optical interposer also comprises one or more first spacers on the first cavity's surface, wherein the one or more first spacers define a plurality of first channels for supporting optical fiber cables;
   wherein the first cavity's surface comprises a planar bottom surface which underlies the first channels and the one or more first spacers, each first channel extending along the planar bottom surface;
   wherein each first spacer comprises a bottom region physically contacting the first cavity's planar bottom surface and made of a different material than the first cavity's planar bottom surface.

2. The optical interposer of claim 1 further comprising, outside the first cavity, electrical circuitry for connection to the one or more transducers.

3. The optical interposer of claim 1 wherein the first cavity's surface comprises a sidewall surface comprising one or more sidewall portions extending upward and laterally outside of the first cavity;
   wherein each first channel has a first end which is adjacent to an associated one of the one or more sidewall portions, each sidewall portion being for providing and/or supporting an optical element for directing light coming into and/or out of the first channel's respective optical fiber cable.

4. The optical interposer of claim 3 wherein the sidewall surface comprises a step underlying at least one sidewall portion, the sidewall surface being at a different angle below the step than the at least one sidewall portion.

5. The optical interposer of claim 3 wherein for at least one first spacer, the bottom region overlies and physically contacts the first cavity's sidewall surface and is made of a different material than at least part of the first cavity's sidewall surface adjacent to the bottom region.

6. The optical interposer of claim 3 wherein each said optical element is a reflective surface formed on the associated sidewall portion, the reflective surface being for reflecting light coming into and/or from a respective optical fiber cable in the first channel, the reflective surface having a different reflectivity property than the associated sidewall portion.

7. The optical interposer of claim 6 wherein each reflective surface is a flat surface being at an angle of at most 60° to the first cavity's planar bottom surface (the angle being between the reflective surface and an imaginary extension of the planar bottom surface beyond the reflective surface).

8. The optical interposer of claim 7 wherein at least one sidewall of at least one first spacer is at an angle of at least 85° to the first cavity's planar bottom surface (the angle being between the first spacer's sidewall and the planar bottom surface underneath the first spacer).

9. The optical interposer of claim 6 wherein the reflective surface comprises metal.

10. The optical interposer of claim 3 wherein the interposer comprises:
    a substrate;
    a layer on the substrate of a different material than the substrate and than the bottom region of each first spacer, the layer providing the first cavity's surface.

11. The optical interposer of claim 3 wherein at least two of the first channels run in different directions and one of the two first channels overlies the other one of the two first channels.

12. The optical interposer of claim 3 wherein each first channel has longitudinal sides defined by one or more of the first spacers, and for at least one first channel, at least one longitudinal side is defined by a discontinuous plurality of the first spacers.

13. The optical interposer of claim 3 further comprising one or more pads over the first spacers, for providing mechanical support to an integrated circuit mounted on the interposer.

14. The optical interposer of claim 13 wherein the one or more pads are metal pads for supporting solder which is for providing mechanical support to at least one of the transducers.

15. The optical interposer of claim 3 wherein at least one first spacer protrudes upward to provide mechanical support for at least one of the transducers.

16. The optical interposer of claim 3 further comprising electrical circuitry formed in at least one of the first spacers.

17. The optical interposer of claim 3 with the optical fiber cables and the one or more transducers optically coupled to the optical fiber cables and electrically connected to electrical circuitry formed in the interposer outside the first cavity.

18. The optical interposer of claim 3 wherein the body comprises a bottom surface having one or more second channels defined therein for supporting optical fiber cables which are for being optically coupled to one or more opto-electrical transducers.

19. The optical interposer of claim 18 wherein the body's bottom surface comprises a second cavity therein;
    wherein the optical interposer also comprises, when viewed upside down, one or more second spacers on the second cavity's surface which define a plurality of the second channels, wherein each second spacer comprises a bottom region physically contacting the second cavity's surface and made of a different material than at least part of the second cavity's surface.

20. A method for fabricating an optical interposer, the method comprising:
    forming a first cavity in a substrate;
    forming a first layer over the first cavity's surface; and
    patterning the first layer to form one or more spacers on the first cavity's surface, wherein the one or more spacers define a plurality of channels for supporting optical fiber cables which are to be optically coupled to one or more opto-electrical transducers;
    wherein patterning the first layer comprises a first etch of the first layer, wherein at least over the first cavity's surface, the first etch terminates based at least in part on etch selectivity to the first cavity's surface.

21. The method of claim 20 wherein forming the first cavity comprises:
    forming a first sidewall of the first cavity; and then
    removing material from the first sidewall to change geometry of the first sidewall.

22. The method of claim 21 wherein removing material from the first sidewall results in changing an angle of at least a portion of the first sidewall.

23. The method of claim 22 wherein removing material from the first sidewall comprises removing the material with a saw to change the angle of at least the portion of the first sidewall to match the angle of a surface of the saw.

24. The method of claim 20 wherein the first cavity comprises:
    a bottom surface; and
    a sidewall extending from the bottom surface upward and laterally outside of the first cavity; and
    wherein at least over the first cavity's sidewall, the first etch terminates based at least in part on etch selectivity to the sidewall.

25. The method of claim 20 further comprising, after forming the first layer in the first cavity but before patterning the first layer to form the one or more spacers, forming electrical circuitry in the interposer, wherein the electrical circuitry is for being connected to the one or more transducers.

26. The method of claim 24 wherein:
    the substrate is monocrystalline silicon;
    forming the first cavity comprises a wet etch of the substrate; and
    wherein the first etch creates a sidewall of the first layer which forms a different angle with a plane parallel to the first cavity's bottom surface than any sidewall of the first cavity.

27. An optical interposer for interfacing one or more optical fiber cables to electrical circuitry, the optical interposer comprising a first surface and a second surface opposite to the first surface;
    wherein the first surface comprises one or more first channels for supporting one or more optical fiber cables; and
    wherein the second surface comprises one or more second channels for supporting one or more optical fiber cables.

28. The optical interposer of claim 27 further comprising electrical circuitry for connection to a plurality of opto-electrical transducers which are for being optically coupled to the optical fiber cables.

29. The optical interposer of claim 27 wherein the optical interposer comprises a substrate, and the plurality of channels are formed in recesses in opposite surfaces of the substrate.

30. The optical interposer of claim 29 wherein the optical interposer comprises electrical circuitry at the first and second surfaces, and comprises one or more conductive paths passing through the substrate for interconnecting electrical circuitry at the first surface and electrical circuitry at the second surface.

31. The optical interposer of claim 29 wherein the substrate is a semiconductor substrate.

32. The optical interposer of claim 29 further comprising circuitry formed at least partially in the semiconductor substrate, for connection to the opto-electrical transducers.

33. A method for fabricating an optical interposer, the method comprising:
    forming a first cavity in a substrate;
    forming a first layer over the first cavity's surface; and
    patterning the first layer to form one or more spacers in the first cavity, wherein the one or more spacers define a plurality of channels for supporting optical fiber cables which are to be optically coupled to one or more opto-electrical transducers;
    wherein forming the first cavity comprises:
    forming a first sidewall of the first cavity; and then
    removing material from the first sidewall to change an angle of at least a portion of the first sidewall.

34. The method of claim 33 wherein removing material from the first sidewall comprises removing the material with a saw to change the angle of at least the portion of the first sidewall to match the angle of a surface of the saw.

35. The optical interposer of claim 1 wherein:
    the first cavity's surface comprises a sidewall surface comprising one or more sidewall portions extending upward and laterally outside of the first cavity;
    at least one first spacer comprises a bottom region physically contacting one or more of the sidewall portions and made of a different material than any of the sidewall portions extending upward and laterally outside of the first cavity.

36. The optical interposer of claim 6 with each said optical element, wherein for each said sidewall portion, the corresponding optical element is provided by the sidewall portion or by a reflective layer on the sidewall portion.

37. The method of claim 20 wherein the first cavity's surface comprises one or more sidewall portions extending upward and laterally outside of the first cavity;
    wherein each first channel has a first end which is adjacent to an associated one of the one or more sidewall portions, each sidewall portion being for providing and/or supporting a reflective element for directing light coming into and/or out of the channel's respective optical fiber cable, each reflective element being the sidewall portion or a reflective layer formed on the sidewall portion.

38. The method of claim 20 wherein the one or more spacers are provided by the first layer.

39. The method of claim 20 wherein after the patterning, the first layer is remains at a location of each channel, and the one or more spacers are provided by a second layer and are defined by the first layer's portions remaining at the location of each channel.

40. The optical interposer of claim 1 with the optical fiber cables and the one or more transducers optically coupled to the optical fiber cables and electrically connected to electrical circuitry formed in the interposer outside the first cavity.

41. The optical interposer of claim 2 with the optical fiber cables and the one or more transducers optically coupled to the optical fiber cables and electrically connected to electrical circuitry formed in the interposer outside the first cavity.

42. The optical interposer of claim 4 with the optical fiber cables and the one or more transducers optically coupled to the optical fiber cables and electrically connected to electrical circuitry formed in the interposer outside the first cavity.

43. The optical interposer of claim 5 with the optical fiber cables and the one or more transducers optically coupled to the optical fiber cables and electrically connected to electrical circuitry formed in the interposer outside the first cavity.

44. The optical interposer of claim 6 with the optical fiber cables and the one or more transducers optically coupled to the optical fiber cables and electrically connected to electrical circuitry formed in the interposer outside the first cavity.

45. The optical interposer of claim 7 with the optical fiber cables and the one or more transducers optically coupled to the optical fiber cables and electrically connected to electrical circuitry formed in the interposer outside the first cavity.

46. The optical interposer of claim 8 with the optical fiber cables and the one or more transducers optically coupled to the optical fiber cables and electrically connected to electrical circuitry formed in the interposer outside the first cavity.

47. The optical interposer of claim 9 with the optical fiber cables and the one or more transducers optically coupled to the optical fiber cables and electrically connected to electrical circuitry formed in the interposer outside the first cavity.

48. The optical interposer of claim 10 with the optical fiber cables and the one or more transducers optically coupled to the optical fiber cables and electrically connected to electrical circuitry formed in the interposer outside the first cavity.

49. The optical interposer of claim 11 with the optical fiber cables and the one or more transducers optically coupled to the optical fiber cables and electrically connected to electrical circuitry formed in the interposer outside the first cavity.

50. The optical interposer of claim 12 with the optical fiber cables and the one or more transducers optically coupled to the optical fiber cables and electrically connected to electrical circuitry formed in the interposer outside the first cavity.

51. The method of claim 20 further comprising attaching to the optical interposer the optical fiber cables and the one or more opto-electrical transducers.

52. The method of claim 33 further comprising attaching to the optical interposer the optical fiber cables and the one or more opto-electrical transducers.

\* \* \* \* \*

UNITED STATES PATENT AND TRADEMARK OFFICE
CERTIFICATE OF CORRECTION

PATENT NO. : 8,757,897 B2
APPLICATION NO. : 13/362898
DATED : June 24, 2014
INVENTOR(S) : Valentin Kosenko et al.

It is certified that error appears in the above-identified patent and that said Letters Patent is hereby corrected as shown below:

In the Specification

In Column 1, line 51, "mirror 140.2" should read "mirror 144.2".

In Column 1, line 65, "beams 114.2" should read "beams 140.2".

In Column 1, line 66, "fibers 114.2" should read "fibers 104.2".

In the Claims

In Column 17, Claim 29, line 64, delete "plurality of".

In Column 18, Claim 32, line 7, change "29" to -- 31 --.

In Column 18, Claim 39, line 54, delete "is".

Signed and Sealed this
Sixth Day of January, 2015

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,757,897 B2 |
| APPLICATION NO. | : 13/362898 |
| DATED | : June 24, 2014 |
| INVENTOR(S) | : Valentin Kosenko et al. |

It is certified that error appears in the above-identified patent and that said Letters Patent is hereby corrected as shown below:

IN THE CLAIMS

Column 15, line 38, "the one or more optical fiber cables" should read: -- the plurality of optical fiber cables --.

Column 18, line 9, "the opto-electrical transducers" should read: -- opto-electrical transducers which are for being optically coupled to the optical fiber cables --.

Signed and Sealed this
Thirty-first Day of May, 2016

Michelle K. Lee
*Director of the United States Patent and Trademark Office*